United States Patent
Takai et al.

(10) Patent No.: US 8,739,685 B2
(45) Date of Patent: Jun. 3, 2014

(54) TOFU COAGULANT PRODUCING APPARATUS AND SOYMILK COAGULATION MACHINE COMPRISING THE SAME

(75) Inventors: Toichiro Takai, Ishikawa (JP); Toru Awazu, Ishikawa (JP); Motonari Amano, Ishikawa (JP); Masahiro Yoshida, Ishikawa (JP); Masaaki Watanabe, Ishikawa (JP)

(73) Assignee: Takai Tofu & Soymilk Equipment Co., Ishikawa-gun, Ishikawa (JP)

( * ) Notice: Subject to any disclaimer, the term of this patent is extended or adjusted under 35 U.S.C. 154(b) by 427 days.

(21) Appl. No.: 12/929,059

(22) Filed: Dec. 28, 2010

(65) Prior Publication Data

US 2011/0154992 A1 Jun. 30, 2011

(30) Foreign Application Priority Data

Dec. 28, 2009 (JP) .................. 2009-298996

(51) Int. Cl.
*A23L 1/00* (2006.01)
(52) U.S. Cl.
USPC .................... 99/275; 99/516; 99/517
(58) Field of Classification Search
USPC .................... 99/275, 516, 517; 426/634
See application file for complete search history.

(56) References Cited

U.S. PATENT DOCUMENTS

| | | | | |
|---|---|---|---|---|
| 4,791,001 A | * | 12/1988 | Matsuura et al. | 426/634 |
| 4,992,294 A | * | 2/1991 | Noguchi | 426/634 |
| 5,190,787 A | * | 3/1993 | Takeoka et al. | 426/634 |
| 6,331,324 B1 | * | 12/2001 | Tomita et al. | 426/634 |
| 7,153,537 B2 | * | 12/2006 | Sotoyama et al. | 426/598 |
| 2002/0197369 A1 | * | 12/2002 | Modler | 426/522 |
| 2006/0008570 A1 | * | 1/2006 | Shidara et al. | 426/582 |
| 2008/0145510 A1 | * | 6/2008 | Hattori | 426/634 |

FOREIGN PATENT DOCUMENTS

| | | | |
|---|---|---|---|
| JP | 2908633 B | 4/1999 | |
| JP | 2912249 B | 4/1999 | |
| JP | H11-196816 A | 7/1999 | |
| JP | 3553690 B | 5/2004 | |
| JP | 3654623 B | 3/2005 | |
| JP | 2006-254816 A | 9/2006 | |
| JP | 3853778 B | 9/2006 | |
| JP | 4381362 B | 10/2009 | |

OTHER PUBLICATIONS

Emulsification, pp. 58 to 115.
Japan Society of Home Economics; vol. 55;Ohashi et al, Effect of Different Kinds Seasoning on the Emulsifying Properties of Simulated Mayonnaise Prepared with Diacylglycerol.

(Continued)

*Primary Examiner* — John Wasaff
(74) *Attorney, Agent, or Firm* — Manabu Kanesaka

(57) ABSTRACT

An apparatus for producing tofu coagulant includes a liquid food oil pumping pathway, a liquid food oil tank, a mineral salt solution pumping pathway, a mineral salt solution tank, a plurality of metering pumps, and an emulsion dispersion machine for stirring the liquid food oil with the mineral salt solution to an emulsification phase. The liquid food oil pumping pathway is connected with the mineral salt solution pumping pathway, the mineral salt solution is added in a predetermined ratio for producing the tofu coagulant, and the water phase and the oil phase are stirred and mixed to W/O type (water in oil type) emulsion (without emulsifier).

13 Claims, 7 Drawing Sheets

(56) References Cited

OTHER PUBLICATIONS

La Rivista Italiana Delle; No. 806; Sostanze Grasse; Gruppo Industriale Pieralisi.
Interfacial and Emulsifying Properties of Diacylglycerol; Atsuko Shimada and Kyoko Ohashi; Food Sci. Technol Res., 9(2) 142-147 2003.
Encyclopedia of foods, Feb. 25, 2003; pp. 70-102, 526-544.
Japan Society of Home Economics; vol. 55;Ohashi et al, Effect of Different Kinds Seasoning on the Emulsifying Properties of Simulated Mayonnaise Prepared with Diacylglycerol, (2004).
Showa Women's University; vol. 16-2 (2007); Jyunko Shimada et al; pp. 161-164.
Showa Women's Univertisy; vol. 14 (2005); Mari Midorikawa et al; Effect of Salt Type on the Emulsifying Properties of Water-in-oil Emulsions Prepared with Diacylglycerol . . . .
La Rivista Italiana Delle; No. 806; Sostanze Grasse; Gruppo Industriale Pieralisi, (1992).
Biosci, Biotech, Biochem 58 (7) 1258-1261, 1994, No. 792, Emulsification Properties of Edible Oils.

* cited by examiner

TOFU COAGULANT PRODUCING APPARATUS AND SOYMILK COAGULATION MACHINE COMPRISING THE SAME

RELATED APPLICATIONS

The present application claims priority from Japanese Application No. 2009-298996, filed Dec. 28, 2009, the disclosure of which is hereby incorporated by reference herein in its entirety.

TECHNICAL FIELD

The present invention relates to a tofu coagulant producing apparatus and soymilk coagulation machine comprising the tofu coagulant producing apparatus without emulsifier.

BACKGROUND ART

A mineral salt such as a magnesium chloride (called "Nigari" in Japan) and a calcium chloride works as a tofu coagulant and is used for producing tofu. And a glucono-δ-lactone that is a coagulating component is gluconic acid working as a tofu coagulant and used for producing tofu. It is skilful to make high quality tofu of such a fine texture, a good touch with teeth and tongue, and a good taste. Particularly, magnesium chloride and gluconic acid have a very fast reaction rate with soymilk, and exhibit difficulty in producing the high quality tofu constantly, shown in patent document 4 (JP 3553690B1). Thus, fat and an emulsifier are mixed in a magnesium chloride solution for making emulsified coagulant as water in oil (W/O) type, which emulsified coagulant is commercially available, for example. And, a tofu coagulant which is comprised of magnesium chloride, polyglycerol esters of fatty acids as the emulsifier, and diglyceride, is disclosed in patent document 2 (JP 2908633B1). Diglyceride (DG) and Diacylglycerol (DAG) are the same. And, a tofu coagulant which is comprising a mineral salt coagulant, polyglycerol esters of fatty acids, and fat, is disclosed in patent document 3 (JP 2912249B1).

The above commercially available emulsifier tofu coagulant comprises Nigari, which has a good slow-acting character and which is used in manufacturing tofu products at high temperature solidification and popularized. The commercially available emulsifier tofu coagulant is used preferably for mass production scale at a tofu factory, because it induces stable product quality, low loss, and high working-efficiency. However, some consumers feel a peculiar flavor that is different from the original tofu flavor, and increase a uniform flavor of tofu products to lose distinctive regional production of the same character by different manufacturers. Moreover, the commercial emulsifier tofu coagulant is 5 or 6 times more expensive than normal Nigari. The occasion of the recent economic downturn rises fuel and soybean costs and, wholesale price down pressure has been forced, in addition to having to use an expensive tofu coagulant. Thus, tofu manufacturers' economic burden becomes more and more. For reducing tofu costs, so that a tofu manufacturer doesn't use the expensive tofu coagulant as much as possible to provide consistent high-quality tofu production. Furthermore, since the commercial emulsifier tofu coagulant includes synthetic emulsifiers and stabilizers, it has a good slow-acting character, but it is necessary to use with high-power emulsifying dispersion a machine for good dispersion. Therefore, sometimes dispersion level of the commercial emulsifier tofu coagulant is low and tofu products lost or amount of the commercial emulsifier tofu coagulant is much and tofu products are deteriorated during the distribution process. In recent years, as the global boom in Japanese food, tofu is a situation where demand is growing by the principal natural food, especially among vegetarians. Especially in the West, has increased the demand for organic products, processed food in Japan is about 60% organic soy milk and tofu products that situation would. In the future, tofu products, consisting of natural raw materials are expected to continue to increase as the representative of the expected natural food without any synthetic chemical food additive.

The assignee herein obtained patent grant and issuance of a tofu manufacturing method in patent document 1 (JP 3654623B1) which is given in the device configuration and does not use emulsifiers as additives. However, in actual exploitation, since an applicable scope is narrow, there has been a case where sufficiently satisfactory high-quality tofu is not obtained depending on selection and a combination of the kinds of food oil and the concentrations of Nigari. For reducing the cost of W/O type emulsified coagulant, it is necessary to use less oil, reduce the amount of an aqueous phase, and use an aqueous Nigari solution of higher concentrations, for example. However, use of high-concentration Nigari can stabilize the emulsion and increase the viscosity of the emulsion depending on the emulsifying conditions, but it is difficult to make optimal and stable emulsified phase affected by heat such as a friction heat, thus practical slow-acting coagulation reaction being hard to obtain. In use of Nigari concentration in less than 2M, inconvenience (demulsification) resulting from exotherm and increased emulsion viscosity is less obvious.

Studies on W/O type emulsion characteristics that use salt water and processed fat (main component: 80% or more of DAG) and do not use an emulsifier as an additive, are made and disclosed in related art document 2 and related art document 5. But, in those related art documents 2 and 5, slow-acting character is not evaluated as a tofu coagulant, and the concentration of a magnesium chloride solution is 0.5M or less, and it is not affected by heat such as friction heat. And it is only evaluated that salt water phase and oil phase ratio is 1:1. Other conditions herein are that unit M is the molar concentration per liter of a solution, that the concentration of magnesium chloride solution used herein is about 10% w/w in terms of magnesium chloride hexahydrate crystal of molecular weights of approximately 203 and that the specific gravity is approximately 1.036. If using as coagulation of soymilk a diluted salt solution, the aqueous phase increases and it is necessary to increase the amount of fat, thus resulting in that this is not economical. DAG is a fat which is the same as conventional triacylglycerol (TAG). DAG is a fat component that is comprised of a number of commercial vegetable oils such as olive oil, as disclosed in related art document 6.

The assignee filed an application for a tofu manufacturing method that uses an emulsion obtained by stirring and mixing a coagulant solution and a culinary fat containing DAG having an oil phase of 1% or more, or uses a tofu coagulant which is a cooled, stirred and mixed water-in-oil type (W/O type) emulsion brought to a temporarily stable W/O type emulsion state without adding any emulsifier and which attains a slow-acting effect of soymilk coagulation reaction (patent document 6). And, a continuous emulsification device for dressing is disclosed in patent document 7. Generally, dressing is an O/W type emulsion. And, an O/W type emulsion for margarine or chocolate which does not use an emulsifier is disclosed in patent document 8. Generally, margarine and chocolate are solid foods that stabilize culinary fat with a high melting point by crystallization of the culinary fat. A W/O type emulsion which comprises artificial 1,2-DAG of not less than 50% in DAG is disclosed in patent document 9. But, related art document 7 shows that a ratio of 1,2-DAG versus 1,3-DAG is 3:7 in natural fat.

PATENT DOCUMENT

Patent document 1 is JP 3654623B1.
Patent document 2 is JP 2908633B1.
Patent document 3 is JP 2912249B1.
Patent document 4 is JP 3553690B1.
Patent document 5 is JP 3853778B1.
Patent document 6 is JP Application 2010-168533.
Patent document 7 is JP HEI 11-196816A.
Patent document 8 is JP 2006-254816A.
Patent document 9 is JP 4381362B1

RELATED ART DOCUMENT

Related art document 1 is "Solubilization and emulsification technique", edited by A. Tsuji and issued by Engineering Library Co., Ltd, pp 58-114.

Related art document 2 is A. Shimada and K. Ohashi, Effect of salt type on the emulsifying Properties of water-in-oil emulsions prepared with diacyglycerol without an emulsifier, School of Human Life Sciences Showa Women's University, Vol. 14, pp 31-38, 2005.

Related art document 3 is A. Shimada and K. Ohashi, Interfacial and emulsifying properties of diacyglycerol, Food science technology research, No. 9, pp 142-147, 2003.

Related art document 4 is M. Kimura, et al., Emulsifying properties of various vegetable oils, Bioscience, Biotechnology, and Biochemistry (Japan Society for Bioscience, Biotechnology, and Agrochemistry) Z53-G223, vol. 58, pp 1258-1261, 1994.

Related art document 5 is K. Sugita, et al., Encyclopedia of Japan foods, Ishiyaku Publishers, Inc., pp 527-544, First edition, 2003.

Related art document 6 is Riv. Ital. Grasse, La Rivista italiana delle sostanze grasse, Vol. 69, pp 443-447, 1992.

Related art document 7 is, Interface handbook, N.T.N. Co., Ltd, first edition, page 1096, 2001.

Related art document 8 is, Handbook of oil chemistry, Maruzen co., ltd, fourth revised edition, page 10, 2001.

Related art document 9 is, Handbook of oil chemistry, Maruzen Co., Ltd, third revised edition, pp 148-149.

DISCLOSURE OF THE INVENTION

Problems the Invention Intends to Solve

In above patent document 1, a milky juice (emulsion) is obtained from liquid oil such as soybean oil and an aqueous thin magnesium chloride solution using emulsion circulation means. The concentration of the magnesium chloride solution is about 1.8 M (about 33% w/w in terms of magnesium chloride hexahydrate, and specific gravity of approximately 1.1). However, since the milky juice (emulsion) will return to the original phase in some seconds, it is necessary to take the circulation treatment continuously during use. Use for a long time will easily cause demulsification due to exotherm and increased viscosity. Therefore, the milky juice is difficult to handle. A feed pump having a stator and a rotor fitted therewith and rubbing each other like a mono-pump easily causes demulsification because of an emulsion rubbing action. Moreover, in case of a W/O ratio of 1:1, the concentration of the magnesium chloride in the emulsion is 17% w/w and additive ratio for soymilk is 1.7 to 1.8%, and in case of a W/O ratio 2:1, the concentration of the magnesium chloride in the emulsion is 22% w/w and additive ratio for soymilk is 1.3 to 1.4%. There is no emulsifier and it is advantageous to use more oil, so that the emulsion additive amount is much more in actuality. Then, it is necessary to use a large feed pump and a large tank, and material cost is increased because of use of food oil. Unless otherwise specified, "%" equals "weight percent". The concentration of the magnesium chloride is in terms of magnesium chloride hexahydrate crystal (MgCl2 6H2O).

In above patent documents 2 and 3, the more the amount of polyglycerine fatty acid ester, the slower the reaction is, resulting in flavor getting worse. The polyglycerine fatty acid ester is a strong emulsifier and produces uneven soymilk when strong circulation means is unused. And in case of it happens that white speck remains in tofu, the speck sticks on package film, and cloth does not easily remove momen-tofu from it. Therefore, it is necessary to use a high-speed mixer at a higher rpm continuously and the mixer is over-loaded. The other documents than the above cited do not show the W/O type tofu coagulant producing apparatus or method using a high salt-concentration water phase and fat without use of any emulsifier.

The inventors herein developed the manufacturing method as in patent document 1 which is given in the device configuration and does not use emulsifiers as additives. In case of the method, it is necessary to keep an emulsification state continuously by machine. But, it is difficult to make optimal and stable the emulsified phase affected by heat such as friction heat, thus practical slow-acting character being hard to obtain. Moreover, to keep emulsification state continuously by machine circulation, it is necessary to avoid an increase in temperature that is a cause of braking the emulsified phase.

After that, the inventors herein studied hard, and found the manufacturing conditions in which is obtained practical slow-acting character for satisfying producing tofu constantly without any emulsifier. In other words, an emulsifier is not used as an additive, a liquid food oil including DAG and a mineral salt solution are selected, and emulsified conditions are controlled to obtain the tofu coagulant easily.

The object of the present invention is, therefore, to provide a tofu coagulant producing apparatus and soymilk coagulation machine comprising the tofu coagulant producing apparatus without an emulsifier. In obtaining a tofu coagulant, liquid food oil with a mineral salt solution is used only without using an expensive commercially available emulsifier. The tofu manufacturers use the obtained tofu coagulant and produce tofu with their original flavors retained constantly and economically. Moreover, the obtained pieces of tofu are improved in their image and as natural food with safety, ease, and high quality.

SUMMARY OF THE INVENTION

To accomplish the above object, the present invention provides an apparatus for producing tofu coagulant, comprising: a liquid food oil pumping pathway from a liquid food oil tank by a metering pump; a mineral salt solution pumping pathway from a mineral salt solution tank by another metering pump; an emulsion dispersion machine for stirring the liquid food oil with the mineral salt solution to an emulsification phase; wherein the liquid food oil pumping pathway is connected with the mineral salt solution pumping pathway, and the mineral salt solution is added in a predetermined ratio for producing the tofu coagulant, wherein the water phase and the oil phase are stirred and mixed to W/O type (water in oil type) emulsion (without emulsifier).

According to the present invention, the emulsion dispersion machine is continuous processing type. It is preferable that each of the materials supplied from metering pumps passes an emulsification chamber of the emulsion dispersion machine in one way passing when volume of the emulsion chamber casing is one to two times larger with respect to the outer volume of the stator/rotor part. The emulsion dispersion machine with continuous batch processing in which each of the materials supplied from metering pumps passes an emulsification chamber of the emulsion dispersion machine in one way passing and a part of the materials supplied is held in the emulsification chamber when volume of the emulsion chamber casing is two to twenty times larger, with respect to the outer volume of the stator/rotor part, is also preferable. The emulsion dispersion machine which does almost batch processing in which each of the materials supplied from metering pumps is held until reaching to a predetermined amount in an emulsification chamber of the emulsion dispersion machine when volume of the emulsion chamber casing is twenty to two thousands times larger with respect to the outer volume of the stator/rotor part, is also preferable. The emulsion dispersion machine can be a batch processing type completely and it is acceptable to manufacture a coagulant by emulsifying a W/O type emulsification coagulant in batch-wise but it is necessary to use metering pump because if it doesn't use metering pump, it decreases emulsification efficiency and is difficult to manufacture the tofu coagulant stably. The obtained tofu coagulant should be kept in a container to refrigerate in the dark place. Also, the obtained tofu coagulant placed in a container and kept in a refrigerating storage or distributed in a chilled condition can be used in soymilk coagulation machine in the remotely-situated location within 1 to 10 days.

According to the present invention, the metering pump for the liquid food oil or the mineral salt solution is most preferably a continuous positive displacement metering pump, such as rotary pumps, tubing pumps (hose pumps), gear pumps, sign pomp, MONO pumps, screw pumps, vane pumps, and MONOFLEX pumps. And low pulsation type pumps are more preferred. For batchwise type, the metering pump for the liquid food oil or the mineral salt solution preferably includes diaphragm pumps, and plunger pumps (piston pumps or syringe pumps). And those multiple pumps provided with an accumulator may be used instead of the continuous pumps. The produced tofu coagulant pathway from the emulsion dispersion machine by a metering pump desirably has a structure in which less shear force and friction heat occur. The flow volume of the continuous positive displacement metering pump may be PID-controlled in the presence of a flow meter. An automatic control may be adopted so as to synchronize equipment in conjunction with the tofu coagulant producing apparatus in a post-processing. And, another metering pump for a soymilk pathway may preferably be automatically controlled.

According to the present invention, a slender liquid coagulant feed pathway (inside diameter of 1 to 15 mm) is connected to a particularly slender liquid oil feed pathway (inside diameter of 1 to 15 mm), the coagulant vigorously fed with a metering pump is added to the edible liquid oil vigorously fed with a metering pump, and the edible liquid oil and the coagulant solution in a state of coarsely mixed are finely mixed by stirring with a strong emulsification disperser. Therefore, a W/O type (water in oil type) emulsified coagulant solution can be produced without addition of an emulsifier and, as a result, the emulsified state can be retained comparatively long. Each flow rate is 0.1 to 1,000 m/sec, preferably 1 to 100 m/sec., forming a sufficiently turbulent state. It is more effective to provide an assistant static mixer in a previous process of the process using the emulsification dispenser, and auxiliary mixing is enabled even at a low flow rate. This is preferred. Though the W/O type (water in oil type) emulsified coagulant is added to soymilk (warm soymilk), as the soymilk, soymilk not using an emulsifier (antifoam, for example) that is a food additive is used and, therefore, tofu products (processed organic foods, for example) can be produced.

In the present invention, the emulsification dispenser preferably has a flow channel shorter from the position of connection between the edible liquid oil feed pathway and the aqueous coagulant solution feed pathway and is preferably provided with an auxiliary mixer (static mixer or the like). An embodiment is preferred, in which the edible liquid oil feed pathway and the aqueous coagulant solution feed pathway are individually connected directly to an emulsification room of the emulsification dispenser. A piping-shaped or connection-shaped structure is preferable in consideration of the facts of the mixing of the edible liquid oil and the aqueous coagulant solution, in which the aqueous coagulant solution is poured into the edible liquid oil, and the possible avoidance of a structure inducing two-liquid separation to retain the specific gravity of the aqueous coagulant solution (1.0 to 1.4) and that of the edible liquid oil (0.8 to 0.9).

In the present invention, by providing plural aqueous coagulant solution feed pathways into which the aqueous coagulant solution is fed with the metering pump from the aqueous coagulant solution tank and adding the aqueous coagulant solution fed with the metering pump to the edible liquid oil fed with the metering plural times at a predetermined ratio, a W/O type (water in oil type) emulsified coagulant is produced. This is preferable. Furthermore, it is preferred that the emulsification disperser is provided every time immediately after the connection between the aqueous coagulant feed pathway and the liquid oil feed pathway. The emulsification dispenser is not limited to that of static type or drive type, and an emulsification dispenser having the same specification as the emulsification dispenser may be adopted. However, plural emulsification dispensers stepwise different in dispersion force may be arranged so as to obtain fine emulsification from coarse emulsification.

According to the present invention, since the aqueous coagulant solution can stepwise be added to the edible liquid oil, an emulsification effect is heightened. It is preferred that the emulsification state is maintained long through the application to the fatty and oil difficult to emulsify, blending of different coagulants and further reduction of the amount of the oil phase. According to the present invention, it is easily adjust an emulsified coagulant in a multilayered emulsification state, such as of an O/W/O type from the emulsified coagulant of the W/O type.

In the present invention, the edible liquid oil feed pathway and/or the aqueous coagulant solution feed pathway are/is provided with cooling means.

In the present invention, in order to stably retain the emulsification state of the emulsified coagulant and manifest the slow-acting property of the soymilk coagulation, it is effective to provide tanks for raw materials, pumps, liquid feed pathways, emulsification dispersers and cooling means (dual-structure heat exchangers, corrugated tubes, etc.) immediately rear the dispersers, thereby cooling the system. In addition, as described later, though the tendency shows that a thick aqueous coagulant solution and a small amount of the oil phase induce exotherm with ease, cooling easily exhibits viscosity of emulsion to enable the emulsification state to be made more stable. Generally, the cooling is indirectly performed through the heat exchangers having coolants of −40 to 10° C., such as chiller water or brine, provided in each of the pathways. In addition, it is also effective to refrigerate each raw material immediately before its use or place the apparatus of the present invention in a cold room. Furthermore, the temperature of the emulsified coagulant after cooling or immediately before coagulation is 50° C. or less, preferably 30° C. or less, more preferably 20° C. or less.

The emulsification disperser is provided with the cooling means and/or pressure application means, and pressure application, cooling or cooling while pressure application is performed during kneading with the emulsification disperser.

According to these inventions, the thicker the aqueous coagulant solution, the more easily the exotherm such as stirring heat induces at the time of emulsification dispersion relative to oil and fat and, therefore, it is preferred that cooling with the cooling means is performed. When continuing emulsification dispersion long without performing the cooling, further exotherm is induced and inversely unification of dispersion particles proceeds, the emulsification state becomes instable, and the tofu coagulation slow-acting effect is possibly lowered. When the target temperature is room temperature or more, air cooling is adopted and, when the target temperature is less than the room temperature, indirect cooling using water cooling or a coolant including chiller water is adopted. In either case, it is at least necessary to perform endotherm of part or majority of the stirring heat. The cooling temperature is up to the melting point (congeal point) of the edible liquid oil used. Strictly, the melting point (congeal point) has its own range depending on the crystalline morphology of the oil and fat and the lower limit of the cooling temperature is set to be up to the minimum temperature of the congeal point. Incidentally, it is necessary to at least adopt the temperature more than the congeal point of the thick aqueous coagulant solution. Similarly to the aforementioned, it is generally perform indirect cooling through the heat exchanger having a coolant of −40 to 10° C., such as chiller water or brine, provided in each of the pathways. In addition, it is also effective to refrigerate each raw material immediately before its use or place the apparatus of the present invention in a cold room.

In addition, it is possible under pressure application conditions to suppress cavitation at the time of emulsification dispersion and prevent a decrease in emulsification efficiency. Generally, minimum amounts of valves, orifices, back pressure valves and control valves are used to control the inner pressure to 0.001 to 1.0 MPa, preferably 0.01 to 0.3 MPa. In comparison with the viscosities of the edible liquid oil and aqueous coagulant solution, the viscosity of the W/O type emulsified coagulant of the present invention is generally 2,000 cP or more that is at least 10 to 100 times higher than that of the raw liquid owing to the reflection of the emulsification state. Therefore, it is a tendency that the inner pressure is naturally higher at a position after the emulsification disperser than that before the emulsification dispenser. Inversely, since maintaining the inner pressure constant results in making the emulsification state effectively stable constantly, it is preferred that outlet piping from the emulsification disperser and/or from immediately after the emulsification disperser is provided with back pressure means. An embodiment using the cooling means concurrently is more preferable.

In the present invention, it is preferable that the edible liquid oil feed pathway and/or the aqueous coagulant solution feed pathway are/is provided with a flow instrument and an indicating control needle and, at the same time, that a control function is provided so that the discharge rate of each metering pump may automatically be controlled using a flow rate signal of each raw material liquid. It is also preferable that the soymilk feed pathway is similarly provided with the control function.

According to the present invention, it is possible to adjust the flow rate fluctuation at the time of valve switching particularly through feedback control and make the flow rate stable immediately after the valve switching. Even when, in the stable flow rate state, the standby state capable of feeding liquids to a production circuit is switched to the production circuit, the liquids are fed in a stable state without disturbing the flow rate and mixed together. Since the liquids are mixed together at a uniform ratio even at the emulsification disperser to rapidly obtain the emulsification state with ease, slight coagulation unevenness can also be prevented.

In the present invention, it is preferred that the edible liquid oil feed pathway and/or the aqueous coagulant solution feed pathway are/is provided with circulation lines and that the return lines thereof are provided thereon with back pressure means.

According to the present invention, particularly there are raw material-related circulation pathways and, in the presence of the back pressure means, it is possible to adjust pressure difference at the time of the valve switching to be small and make the flow rate stable immediately after the valve switching. Even when, in the stable flow rate state, the standby state capable of feeding liquids to the production circuit is switched to the production circuit, the liquids are fed in a stable state without disturbing the flow rate and mixed together. Since the liquids are mixed together at the uniform ratio even at the emulsification disperser to rapidly obtain the emulsification state with ease, slight coagulation unevenness can also be prevented. Since inner pressure is induced after the emulsification disperser and since higher inner pressure is applied with the back pressure means, it is necessary to add the pressure of the emulsification disperser so as to balance the inner pressure in the process prior to the emulsification disperser and form the pressure application state of each raw material liquid feed pathway side by means of each metering pump. Since the affects of fluctuation due to delicate pulsation of the pump for making the pressure application state stable and due to fluctuation resulting from long-term use are alleviated, it is a tendency that the inner pressure of the circulation pathway (return pipe) of each raw material liquid feed pathway and the back pressure means becomes heightened. Inversely, in the present invention, since controlling the inner pressure to be constant produces the effect of stabilizing the emulsification state constantly, it is preferred that the outlet piping from the emulsification disperser and/or from immediately after the emulsification disperser is provided with the back pressure means and that piping for supply to the emulsification disperser is provided with similar back pressure means.

The soymilk coagulation apparatus of the present invention for producing tofu comprises an emulsified coagulant producing apparatus used for producing tofu, piping connected to the emulsification disperser for feeding the produced emulsified coagulant, piping connected to a soymilk feed pathway for feeding soymilk from a metering tank with a metering pump or an emulsified coagulant feed pathway which has a metering pump disposed on piping for feeding the emulsified coagulant from a tank in which the emulsified coagulant is once stored, which is connected to the soymilk feed pathway for feeding soymilk from a soymilk tank and which is connected to a coagulant disperser for stirring and mixing these liquids.

The present invention relates to a soymilk-coagulating apparatus, whereby a predetermined amount of the emulsified coagulant produced with the apparatus for producing the emulsified coagulant for producing tofu is added to the soymilk and demulsification is performed with the coagulant disperser. It also relates to a coagulator, whereby the soymilk is continuously supplied to the coagulant disperser, with the emulsified coagulant feed pathway connected to the soymilk feed pathway, or the emulsified coagulant is continuously mixed with the soymilk using a receiver tank and the metering pump connected to the soymilk feed pathway, with the emulsified coagulant once obtained from the emulsified coagulant feed pathway, temporarily stored and received in the receiver tank of the emulsified coagulant supply pathway provided in a soymilk coagulator and demulsification is performed with the coagulant disperser to coagulate the soymilk.

In the soymilk-coagulating apparatus for producing tofu, it is preferable to use edible oil and fat containing 1% or more of diacylglycerol as the edible liquid oil and, as the aqueous coagulant solution, a thick aqueous coagulant solution of 2M or more.

The present invention relates to an oil-in-water type (O/W type) emulsion produced using the emulsification dispersing means for stirring and mixing the aqueous coagulant solution and the edible oil and fat containing 1% or more of DAG in the oil phase thereof. In addition, it relates to an apparatus for obtaining an emulsified coagulant for producing tofu, that is an oil-in-water type (O/W type) emulsion produced by stirring and mixing of the water phase that is the aqueous coagulant solution and the edible oil and fat containing 1% or more of DAG in the oil phase thereof, with at least one of them cooled.

According to the present invention, it is economical that use of a thick aqueous coagulant solution of particularly 2M or more as the water phase can reduce the amount of an expensive oil and fat. The thicker than a diluted aqueous solution of less than 2M (the closer to a saturated aqueous solution) the aqueous coagulant solution, the higher the effect of delaying a soymilk coagulation reaction is. This is because the viscosity increases at the time of emulsification and it is thought that the high viscosity of the emulsified coagulant prevents unification of the fine dispersion particles (water phase) at the time of emulsification to obtain stabilization and that the finer the dispersion particles after being added to and stirred together with the soymilk, the higher the effect of slow acting for delaying the soymilk coagulation reaction is. However, in case where the aqueous coagulant solution is thicker, exotherm including stirring heat is likely to occur at the time of emulsification dispersion together with oil and fat and, as described above, it is preferable to perform cooling with the cooling means. In addition, the cavitation is likely to occur by the use of the emulsification disperser at a high temperature and, as described above, it is more preferable to concurrently use the pressure application means.

It is known that DAG easily obtains O/A type emulsification and, as described in related art document 2, an O/A type emulsion. In related art document 3, however, the used oil and fat is chemically synthesized, contains DAG of approximately 87% and thus has a high concentration. Moreover, while the melting point of the DAG having a constituent oil and fat excluding linoleic acid and linolenic acid is 20 to 70° C. that is high (related art document 9), the oil and fat containing much DAG has a feature of being solidified at normal room temperature. This point is not touched upon at all. If the tofu coagulant having brine dispersed in the oil and fat solidified as described in related art document 4 is as-is added to soymilk to coagulate the soymilk, even when the coagulation reaction exhibits a slow-acting property, an automatic mechanical operation becomes very difficult. In the case of actually using a commercially available emulsifier, the pipe pathway and tank thereof are difficult to wash with water and the emulsifier when being mixed with water becomes a highly viscous substance and, in the case of washing fouling attached to the wall of the apparatus, mere use of a small amount of thin neutral detergent exhibits a deep aspect. In the present invention, the solidified oil and fat is beforehand warmed to its melting point or higher to obtain a liquid phase and, even when the oil and fat is solidified by heating after being emulsified, it is warmed to its melting point or higher before being added to soymilk and is then used. When handling a composition containing much oil and fat easy to solidify, it is preferred that the pipe, tank and valves are provided with warming means. For example, olive oil or rice sugar oil (rice oil) containing DAG of approximately 5 to 10% and natural fat and oil, such as cottonseed oil, are presumed from their fatty acid compositions to contain DAG having a high melting point. However, since the amount of DAG is small, mechanical handling exhibits no hindrance. The oil and fat has a property of fitting in with water (i.e. of low boundary tension) in comparison with soy oil containing DAG of about 1 to 2%. Even when an aqueous magnesium chloride solution having a high concentration is used as a dispersion phase, it has been found that the oil and fat constituting a continuous phase is in a liquid form and contributes to formation of a relatively stable W/O type emulsion. This is because it is clear that the effect of DAG is larger than any other component. Incidentally, in the present invention, since the emulsified coagulant adhering to the apparatus wall, pipe pathway and tank is demulsified after a period of time and moreover since cleaning can be performed with a small amount of thin neutral detergent, cleaning and operating properties are easy to handle and a load exerted on the environment is small.

The edible oil and fat used in the present invention contains no emulsifier and contains DAG of 1% or more (in the form of ester binding of one mole of glycerin and two moles of fatty acid), is preferably subjected to treatment with addition of food additives (process aids) in the ordinary oil and fat producing process, to chemical processing (ester exchange reaction and hardening treatment by the addition of hydrogen) and to no special processing, and is an edible oil and fat product obtained by an ordinary oil expression and oil manufacture processing. That is to say, of the commercially available oil and fat products, a product containing not so much a hydrophilic component exhibiting an emulsification operation, such as lecithin (phosphatide) and containing MAG (which is also hydrophilic) of 1% or less is preferred. An oil and fat product, the contents of which differ depending on the raw material of oil and fat and the grade of the product, and which contains DAG of 1% or less and less that 10% is economical and suitable for operation of the present invention. In the case of processed oil and fat containing DAG of 10% or more, the operation of the present invention is easier, the processed oil and fat becomes solidified and cloudy to be difficult to use, the unit price of the processed oil and fat is high, and the processed oil and fat is selected depending on the price versus effect.

The edible oil and fat in the present invention is not particularly limited in kind, but in the class of raw materials, for example, includes rice oil (rice bran oil, rice germ oil), corn oil, soy oil, canola oil, sunflower oil, safflower oil (high oleic safflower oil), sesame oil (black and white), palm oil, palm kernel oil, olive oil (virgin olive oil, pure olive oil), grape seed oil, hazelnut oil (hazel oil), coconut oil, cottonseed oil, peanut oil, macadamia nut oil, almond oil (sweet almond oil), avocado oil (persea seed oil), linseed oil, pumpkin seed oil, walnut oil, perilla oil (wild sesame oil), cashew nut oil, wheat germ oil, borage seed oil, evening primrose oil, borage seed oil, black currant oil, jojoba oil, camellia oil, rosehip oil, apricot kernel oil, Niger seed oil, teaberry oil, hempseed oil (hemp oil), black mustard oil; vegetable oils and fats, such as shea butter, cacao butter, etc.; naturally-derived oils and fats, such as fish oil, animal fats and oils (beef fat, lard, chicken fat, whale oil, seal oil) and other edible oils and fats. These oils and fats may optionally be blended, and flavor oils and seasoning oils, such as chili oil, may easily be added. Depending on raw material conditions of these edible oils and fats (fruits, seeds, lees including floured germ), oil production conditions including oil expression (cold press compression method), refinement (degumming, deoxidation, wintering), processing conditions including hydrogenation, ester exchange, and suitable blending conditions, the contents of DAG and emulsification stabilities differ. There are many products containing DAG of 1 to 20% (in related art document 8, mostly 1 to 10%) particularly in the case of the naturally-derived oils and fats. Products containing DAG of 2% or more, particularly 5% or more are preferred. It is good that naturally-derived oil and fat and processed oil and fat may be blended in a ratio of 1:0.01 to 1:1.00. In the case expensive processed oils and fats, there is an upper limit in respect of the expense versus the effect. However, since the blending ratio of 1:0.02 to 1:1, for example, can form an oil phase containing DAG of 1% or more, preferably 2% or more, further preferably 5% or more even in the case of using a not appropriate but natural oil and fat. Incidentally, the present invention does not use artificially processed oil and fat, but may use naturally-derived oil and fat only produced for food. According to related art document 7, it is stated that the ratio of 1,2-DAG to 1,3-DAG in the naturally-derived oil and fats is 3:7. The oil and fat for tofu having soybean used as raw material is preferred to be particularly that of vegetable origin. However, though the kinds of the oils and fats are mainly classified in kind, the contents of DAG differ depending on the quality of the raw materials, oil expression conditions, refinement conditions or processing conditions and thus the oil and fat depends on whether it is suitable for the present invention.

In general commercially available oil and fat mainly contain TAG and small amount of DAG of several % (related art documents 4 and 8). According to the analysis results by Japan Institute of Oil & Fats, Other Foods Inspection, for example, the commercially available rice oil contained DAG of 9.9% and the commercially available cotton oil contained DAG of 7.8% (in respect of other oils and fats, refer to Table 4.). According to related art document 6, the content of DAG was in the range of 5.4 to 9.5% that differ depending on the production areas of the cotton oil. The present invention relates to an apparatus for producing an emulsified coagulant for tofu, which contains no emulsifier and comprises edible oil and fat containing 1% or more of DAG deriving from the raw material (commercially available oil and fat product roughly contains DAG of 1 to 10%, synthesized and processed oil and fat contains DAG of 40 to 99%) and a further thick inorganic salt coagulator for tofu (an aqueous magnesium chloride solution of 2M or more, for example) or relates to an apparatus for obtaining a soymilk coagulum in the form of pudding by introducing the coagulant into a metering soymilk feed pathway and dispersing the resultant with a coagulation disperser. This knowledge has not been known to any prior art.

Incidentally, DAG is one of the components constituting a general oil and fat and, similarly to TAG, one of fatty acid esters including monoacylglycerol (abbreviated as MAG) useful as an emulsifier. DAG exhibits an emulsification effect not so higher than MAG and is shown in related art document 2 etc. as an oil and fat having weak emulsification. There is no commercially available emulsifier comprised mainly of DAG. An oil and fat product, particularly containing DAG of 40% or more, is the processed oil and fat produced through enzymatic reaction of glycerin and fatty acid, and is not handled as an emulsifier. Related art document 3 does not use any emulsifier and reports a W/O type emulsification characteristic feature relative to a processed oil and fat comprising a thin 0.5 M aqueous solution of magnesium chloride and DAG of about 87%.

DAG indicated in the present invention naturally coexists in an oil and fat and is in the form of an ester binding of one molecule of glycerin and two molecules of fatty acid having 8 to 24 carbon atoms. Since commercially available oils and fats mostly contain DAG in no small part, they can be utilized for the embodiments of the present invention though there is a difference in difficulty depending on the contents of DAG. Of commercially available oils and fats and processed oils and fats, since the coexistence of lecitin having relatively strong emulsification or MAG adversely affects the emulsification stability or soymilk coagulation slow-acting property, no or few lecitin or MAG is better. It is preferred that the phospholipid of lecitin is 0 to 0.1% and that the content of MAG is 0 to 1%. It is better that the acid value is higher in the reference interval of the Japan Agricultural Standards and that the amount of free fatty acid calculated from the acid value and average molecular weight is larger. An oil and fat having the acid value of 0.1 or more, or free fatty acid of 0.05% or more, is preferred. The free fatty acid also has weak emulsification. Almost all of the phospholipid, MAG and free fatty acid are removed through degumming and deoxidation steps in the standard oil-producing process. Generally, TAG that is a representative component of an oil and fat is not important in the present invention, but is contained in the amount of 98% or less as the main component other than the above components. TAG of 0% may be all right. Tocopherol (vitamin E), polyphenols and sterols possibly contained in minute amounts in the oil and fat have little effect on the present invention, and their contents are not limited. Oil and fat products for fritter and fry include a product containing around 1% of silicone in order to prevent foaming (oxidation). The silicone functions as an antifoaming agent, affects the surface tension of the oil and fat, has little effect on the boundary tension or emulsification and has no particular influence on working the present invention. However, since there is a case where the silicone cannot be used for goods, such as processed foods of organic produce, it is preferred that oil and fat products containing no silicone are selected.

Though the upper limit of the DAG content is not particularly limited, an oil and fat containing DAG of about 1 to 10% like the commercially available oils and fats is ordinarily used. An oil and fat containing DAG of less than 1% is not suitable for the present invention. Artificially processed oils and fats containing DAG of 40 to 99% can be used solely or in a blended form and can be utilized for the present invention. Generally, DAG has a higher melting point than TAG and a large amount of DAG affects the cooling conditions, produces crystallization near normal room temperature and affects emulsification stability. According to related art document 9, the melting point of DAG is $-2.6°$ C. in the case of 1,3-dilinoleic acid, $-12.3°$ C. in the case of 1,3-dilinolenic acid and $21.5°$ C. in the case of dioleic acid, and 1,2-DAG entirely has a high melting point of 20 to $70°$ C. Even when an oil and fat mainly contains much DAG having a low melting point, a bad influence by crystallization is difficult to occur. When DAG has a high melting point, there is a case where warming exceeding the melting point rather than cooling is preferably adopted to perform emulsification dispersion. In the case of an oil and fat containing much DAG having a particularly high melting point, the temperature is retained at that higher than the melting point at the time of emulsification to enable the W/O type emulsification to be formed with ease (difficulty in operation including automatic mechanical metering is difficult to occur) and it is also possible to retain the W/O emulsification state stably by cooling after the emulsification. In this case, it is preferred from the viewpoint of mechanical handling that the emulsified coagulant (coagulant for tofu) is warmed, before being added to soymilk, up to a temperature higher than the melting point to heighten the flowability in the form of the liquid oil and fat.

EFFECTS OF THE INVENTION

According to the soymilk coagulation apparatus of the present invention for tofu production, it is possible to obtain the temporarily stable W/O type emulsification state without using an expensive and commercially available emulsification preparation attaining slow-acting for delaying the soymilk coagulation reaction. By mixing the emulsification preparation with soymilk, it becomes possible to produce tofu products having an image of "natural foods" with no anti-foaming agent and no emulsifier or tofu products and their processed foods regarded as the processed foods of organic produce (JAS standards).

When some conditions, such as selection of oil and fat kind and use of cooling means and emulsification disperser, have been satisfied, brine and oil and fat are relatively easily mingled to obtain inexpensively an emulsified coagulant (coagulant for tofu) having a slow-acting property of the soymilk coagulation reaction. For example, it is possible to produce inexpensively silken tofu using high-quality 100% brine. The apparatus washability of a pipe pathway for the emulsified coagulant is enhanced. It goes without saying that the present invention can be applied to firm tofu produced by breaking, pressing and molding silken curd, fried bean curd and thick deep-fried bean curd and utilized for various tofu processed products.

DETAILED DESCRIPTION OF THE INVENTION

Figure 1:
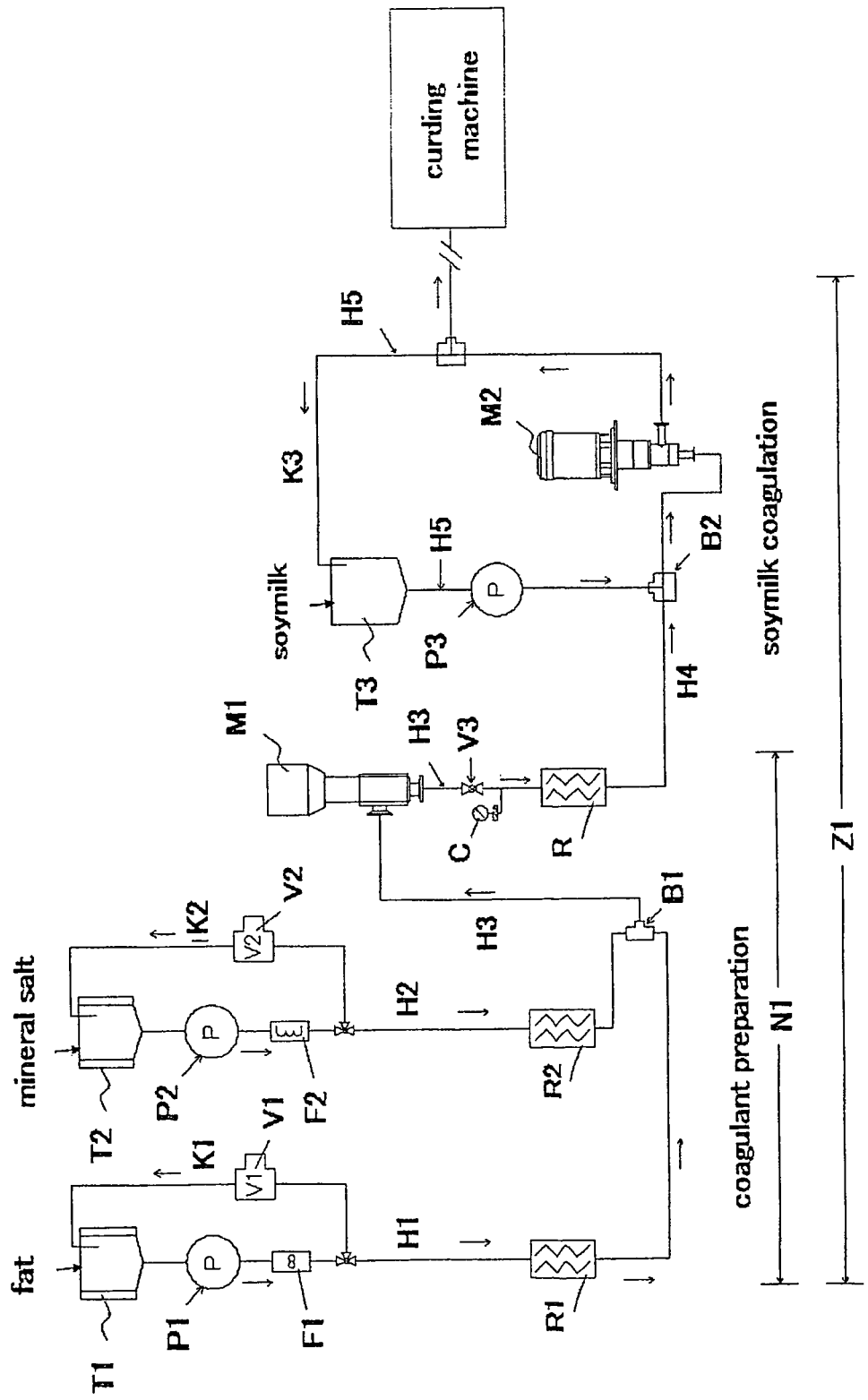
FIG. 1 is a schematic view for illustrating the soymilk coagulation machine with the one-way continuous pathway comprising the tofu coagulant producing apparatus according to the first embodiment of the present invention.

Next, the description will be made concerning some concrete embodiments according to the present invention by referring to the drawings.

First Embodiment

FIG. 1 shows the soymilk coagulation machine Z1 comprising the tofu coagulant producing apparatus according to the first embodiment of the present invention, and the soymilk coagulation machine Z1 comprises of a liquid food oil tank T1, a mineral salt solution tank T2, an emulsion dispersion machine M1, working as a emulsion dispersion means, to which each of the liquid food oil in the liquid food oil tank T1 and the mineral salt solution in the mineral salt solution tank T2 is supplied by using two different supplying means (metering pumps) P1, P2 and then in which a mixture of the liquid food oil and the mineral salt solution is continuously emulsification-distributed, and back-pressure means V1, V2 in order to apply some internal pressures to each of the liquid food oil and the mineral salt solution which feed from each of the liquid food oil tank T1 and the mineral salt solution tank T2. The composition described above is a tofu coagulant producing apparatus N1, and the soymilk coagulation machine Z1 is formed by adding to the tofu coagulant producing apparatus N1 a connecting path, through which high temperature soy milk feeds from a soymilk tank T3, and a mechanism (a soy milk solidification part), by which the high temperature soy mixed with the tofu coagulant feeds to a dispersion machine M2. That is to say, edible oil and fat and coagulant (called "Nigari" in Japan) are mixed (in a coagulant preparation part), and things that are mixed with the edible oil and fat and the coagulant feed to the emulsion dispersion machine M1, the things are mixed with the high temperature soy milk which feed from the soymilk tank T3, ant then what are mixed with the things and the high temperature soy milk feed in the dispersion machine M2 (a soy mill coagulant part). It is possible to do another embodiment in which junction B1 where the liquid food oil pathway H1 for liquid food oil connects with the mineral salt solution pathway H2 is not set up and the emulsion dispersion machine M1 are connected with the liquid food oil pathway H1 and the mineral salt solution pathway H2 directly and separately.

In each of tanks for the liquid food oil and the mineral salt solution tank T1, T2, the feedback pathways K1, K2 (circulation pathway), and output pathways for liquid food oil and the mineral salt solution H1, H2, each of cooling units R1, R2 (heat exchangers) is provided. As well, each of cooling units R1, R2 can cool down any one of at least the liquid food oil and the mineral salt solution. In a soymilk pathway H5, a circulation pathway is also provided and the back-pressure means V1, V2 are set up on the return pathway. Various things including a positive displacement pump, a ball cock, a butterfly valve, a control valve, a siphon, an orifice, a back pressure regulating valve (including automatic or manual), a flow control valve (flow regulating valve) or a combination of the various things can be applied to the back-pressure means V1, V2 and it's preferred that the number of the back-pressure means because, such as one or two set, is smaller there is fear of demulsification, when it arranges too many of these. By maintaining the pressure at the time of the solidification of soy milk at regularity pressure by a back pressure means, when it changes from a cycling pathway to a producing pathway, pressure difference decreases and it becomes difficult to produce change of a soy milk flow. Therefore, the stable coagulated condition without solidification unevenness etc. can be acquired.

In addition, it is desirable to prepare a cooling device (heat exchanger) in the position etc. which are shown with the mark R in FIG. 1. Moreover, it is more desirable not to adopt the form which prepares many components with a possibility of destroying emulsification things, such as a hopper, a pump, and a valve, as much as possible on the previous soymilk pathway H4 from the tofu coagulant producing apparatus N1 in the equipment Z1 of the form of this embodiment. Moreover, it is desirable to carry out physical stimuli, heating, etc. other than cooling to the composition or the structure which is not performed as much as possible, until just before adding to soy milk.

The cooling units (heat exchanger) R1 and R2 are allotted to the liquid food oil pathway H1 for edible liquid oil, and the mineral salt solution pathway H2 for coagulant solution. In addition, as the cooling units R1 and R2, it is good also as a form which prepares indirect type heat exchangers, such as a plate type heat exchanger, a multi-pipe type heat exchanger, and a double pipe, in the above-mentioned pathways H1 and H2, and good about the storage tanks T1 and T2 also as forms which similarly prepare an indirect type heat exchanger, such as a double jacket, a double pipe, and a corrugated tube.

It is desirable that the heat exchanger R is also arranged at the junction B1, at which the mineral salt solution pathway H2 for coagulant solution was connected to the liquid food oil pathway H1 for edible liquid oil, and the subsequent pathway H3 (See the symbol R in the FIG. 1 to FIG. 5).

The obtained tofu coagulant which changed into the emulsification condition performs conveyance by piping through a heat exchanger so that it may be held below 30 degrees C. or less, preferably 20 degrees C., to keep an emulsification condition until it goes into a soymilk coagulation process (disperser by which the coagulant for tofu is mixed with soy milk).

Thus, according to this embodiment, the temperature of the obtained tofu coagulant is maintained at −10 degrees C. to 30 degrees C. (preferably 0 degrees C. to 20 degrees C.) by the cooling units (heat exchanger) R1, R2, and R, etc. until the emulsification coagulant (coagulant for emulsification tofu which changed into the W/O type emulsification state without using an emulsifier) is added to soy milk. If it is low temperature, it is effective in stabilizing an emulsification state and if it cools to near the melting point of oil and fats, oil-and-fats viscosity increases, it can be easy to hold the detailed and stabilized emulsification dispersion state, and a soy milk solidification delayed effect increases. At a temperature lower than the melting point (correctly below the freezing point), since there is a problem in the blockade of piping, it is hard to deal with it.

The emulsion dispersion machine M1 is intended for stirring and mixing the liquid food oil with the coagulant solution, and, although it will not limit especially if there is performance of powerful emulsification distribution, the high rotation churning type and high-pressure homogenizer as a stator & rotor type are desirable, moreover, a stood type mixer with powerful dispersion force can be used. The machine rotor speed is between 2,000 to 30,000 rpm, preferably, between 5,000 to 20,000 rpm and a rotor peripheral speed is between 1 to 20 m/sec., preferably 5 to 15 m/sec. The minimum clearance between the rotor and the stator is preferably 0.1 to 2 mm. As for the emulsifier dispersion machine M1 in this embodiment, the inside consists of the rotor and the stator, and by the rotor rotation and the gap between the rotor and the stator, the shear force is generated so that the emulsification is achieved. And it is desirable to have a force means other than the cooling unit R and then it becomes possible to cool, pressurizing, or cool with pressurization at the time of stirring, so that a decline in the emulsification efficiency by a cavitation can be prevented. In addition, force means are a valve, on orifice, a back pressure valve, and a control valve etc., and may only be based on the piping resistance by the viscosity increase of an emulsification coagulant.

The dispersion machine M2 (churning mixer) M2 is arranged in the soy milk pathway (soy milk solidification part) H5 sending soy milk with a metering pump from the soy milk temperature preparation tank T3. The things of comparatively weaker emulsification distribution performance (for example, a common stood type mixer, a NORITAKE static mixer, a Takai factory TS mixer, etc.) are enough as the dispersion machine M2. Depending on the emulsification state of an emulsification coagulant, the solidification stirrers for the usual tofu manufacture (one-two churning, screw churning, etc.) can be used. These emulsification diffusion machines and the mixed stirrers are combined arbitrarily, and can be used together.

The cooling unit (heat exchanger) R is built-in the emulsion dispersion machine M1. That is to say, the emulsion dispersion machine M2 is set as the temperature of a request of the coagulant temperature and the edible-fat-and-oil temperature before emulsification processing (under 70 degrees C., preferably under 30 degrees C., more preferably under 20 degrees C.) by letting cooling water (preferably under 10 degrees C., chiller between 0 to 5 degrees C., antifreeze between −40 to 5 degrees C.) pass. A force means are also provided to the emulsion dispersion machine M2, so that it can be considered as the form to pressurize, cool or cool with pressurization at the time of stirring. If the minimums of the coagulant temperature ant the edible-fat-and-oil temperature before emulsification processing are more than a coagulating point of oil and fats or the melting point and more than the coagulating point of coagulant liquid, 0 degrees C. or less may be sufficient as them, and the range of them is usually −10 to 0 degrees C.

Figure 2:
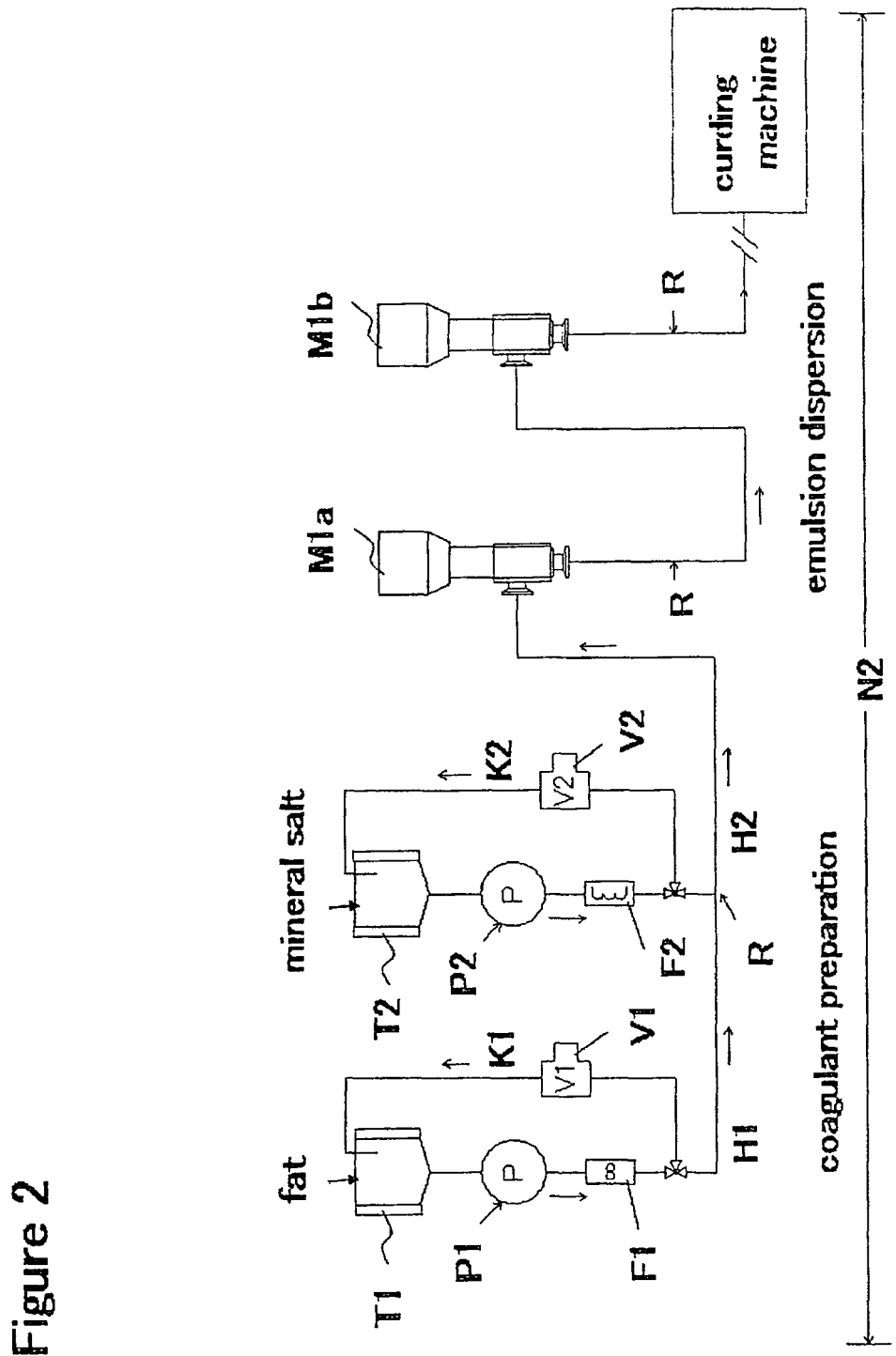
FIG. 2 is a schematic view for illustrating another example as the soymilk coagulation machine with the one-way continuous pathway comprising the tofu coagulant producing apparatus according to the first embodiment of the present invention.

FIG. 2 shows a schematic view illustrating another example as the tofu coagulant producing apparatus N2 according to the first embodiment. That is, after pre-emulsifying by the emulsion dispersion machine M1a, main-emulsifying by the 2nd emulsification disperser M1b, it is also possible to perform emulsification distribution to two or more times. As an advantage in this case, it is mentioned that an emulsification state is maintainable for a long time, that it is not necessary to use a powerful thing for the one emulsification disperser M1a and M1b, and that emulsification particle diameter is made more uniformly. The liquid food oil pathway H1 for the above-mentioned edible liquid oil is constituted as a cycling pathway, the mineral salt solution pathway H2 for coagulant solution is constituted as a cycling pathway, and the back pressure means V1 and V2 are allotted on the return piping. In addition, the above-mentioned emulsifying dispersion machine M1a and M1b may set up like the above-mentioned emulsification disperser M1 to become gradual emulsification distribution called rough emulsification and detailed emulsification, such as stator & rotor type a high rotation churning type, a stood type mixer, etc.

The above-mentioned cycling pathways H1 and H2 are respectively equipped with the flow instruments F1 and F2. As the flow instruments F1 and F2, there are an electromagnetism type, a positive displacement type, etc. and the PID control of flow by an indicating controller may be provided to the flow instruments F1 and F2. PID control is a kind of feedback control and a method of controlling an output value to lose the difference (deviation) of an input value (measured value) and a desired value (preset value) with three elements of proportion (Proportional), integration (Integral) and differentiation (Derivative or Differential). A flow is detected with a flow instrument and the flow sent in with the above-mentioned metering pump is fixed.

Figure 3:
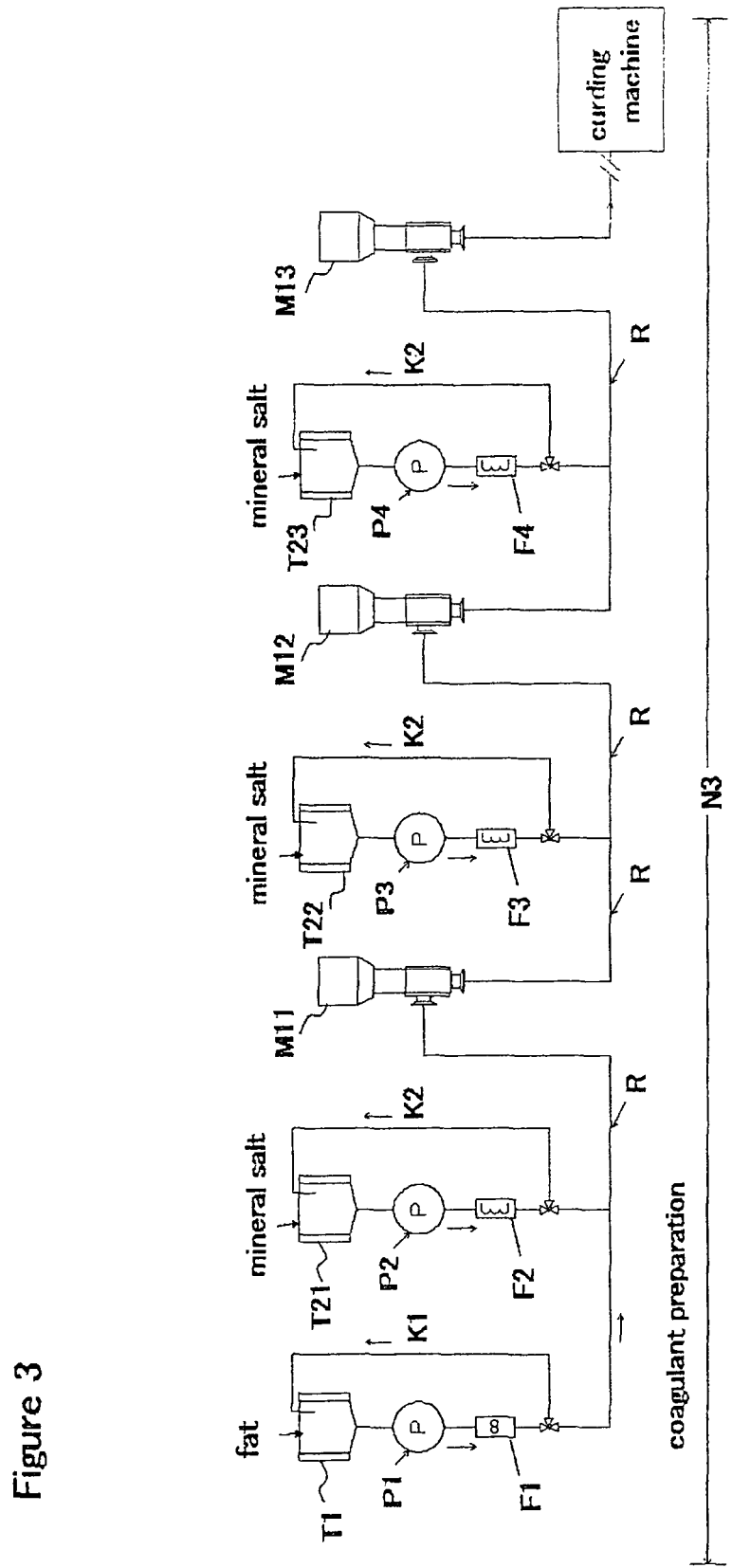
FIG. 3 is a schematic view for illustrating another example as the soymilk coagulation machine comprising the tofu coagulant producing apparatus according to the first embodiment of the present invention.

FIG. 3 shows a schematic view illustrating another example as the tofu coagulant producing apparatus N3 according to the first embodiment, in which two or more mineral salt solution pathways H2 for coagulant solution which join this are allotted, and increase-in-quantity addition of the coagulant is carried out gradually, although the number of the liquid food oil tank (oil-and-fats tub) T1 is one. That is, the bitterness-of-life tubs 1, 2, and 3 constitute two or more of the piping courses H1 and H2 arranged, and are connected one by one from the above-mentioned liquid food oil tank T1. In addition, the above-mentioned pathways H1 and H2 constitute the cycling pathways K1 and K2. Moreover, a heat exchanger and the emulsification disperser M1 are respectively allotted to two or more of these piping, temperature limiting is carried out to it each time, and a temperature domain is adjusted to it.

Second Embodiment

Figure 4:
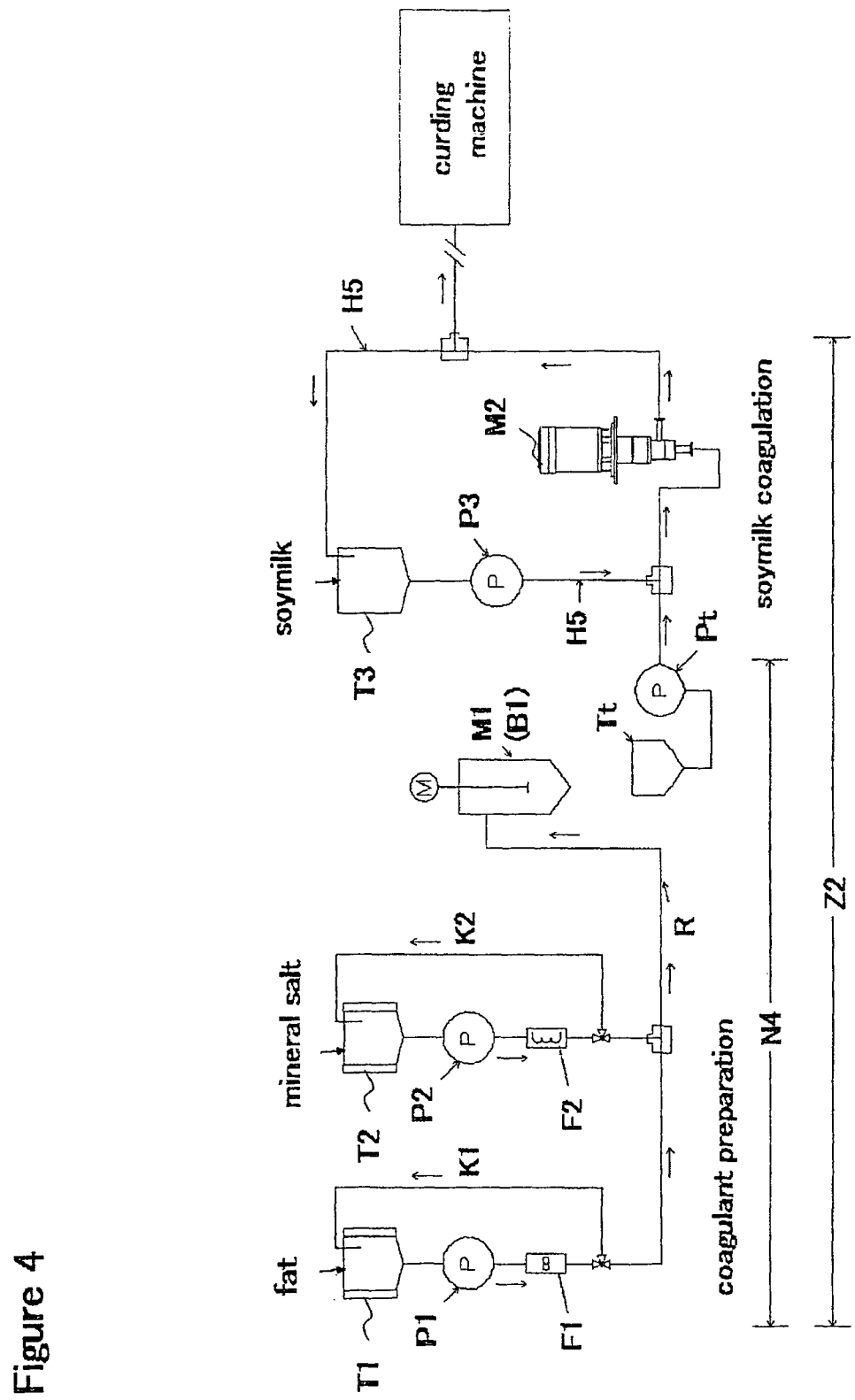
FIG. 4 is a schematic view for illustrating the soymilk coagulation machine with the batch circulation comprising the tofu coagulant producing apparatus according to the second embodiment of the present invention.

FIG. 4 is a schematic view for illustrating the soymilk coagulation machine N4 with the batch circulation comprising the tofu coagulant producing apparatus according to the second embodiment of the present invention. As for the composition of this batch type, the batch container is equipped with the emulsification disperser M1 as a stirrer. The point which has connected the mineral salt solution pathway H2 for coagulant solution to the liquid food oil pathway H1 for edible liquid oil is the same as the form of the first embodiment. With the composition of this batch type, it is a form which quantitatively solution-sends specified quantity of edible liquid oil in time part with the metering pump P1, quantitatively solution-sends specified quantity of coagulant solution in time part with the metering pump P2, after receiving the materials more than the specified quantity to which an emulsification disperser becomes effective in a batch container, starts emulsification, when materials reach to predetermined and full fluid volume, stops the metering pumps P1 and P2, and performs emulsification distribution in time part until after predetermined time. The sum total of time to perform emulsification distribution is for 10 seconds to 60-minutes. That is, the emulsification coagulant which the W/O type (water in oil type) emulsified like a part and 2 times once is manufactured, and this is scooped up by dipper etc., and is moved to the coagulant liquid hopper of soy milk solidification equipment, and is made mix with soy milk in the coagulating process of the following process.

And the manufacturing equipment N4 of the emulsification coagulant for tofu manufacture of the form of enforcement of this batch type is mixed with hot soy milk from the soy milk tank T3, and is independently equipped with the mechanism (soy milk solidification part) sent into the solidification disperser M2. The soymilk pathway H5 of sending soy milk with the metering pump P3 from the soy milk tank T3 consists of circulation pipelines. That is, in order to send into the solidification disperser M2, the emulsification coagulant which the W/O type (water in oil type) emulsified is once saved at the storage tank Tt, and is feed to soymilk pathway H5 by the metering pump Pt.

In addition, as for a soy milk solidification part, although the conventional soy milk solidification machine is not limited other than the mechanism shown in FIG. 4, it is desirable to have the churning mixer which is effective in distributing to soy milk uniformly and making it demulsify an emulsification coagulant. That is, it is desirable to use the conventional soy milk solidification machine (for example, a one-two type solidification machine, a screw type solidification machine they are a stillness mixer or a rotation churning type mixer at an in-line type with the continuous system, a continuous system or batch-type solidification machine in an in-line type and using a stillness mixer or a rotation churning type mixer, and an in-line type rotation churning type mixer or a stillness mixer with powerful distributed churning power).

About the batch container (namely, emulsification room) in the present invention, it can be considered that only a container is the form which became relative very large to the minimum emulsification room of the emulsification disperser M1, and the emulsification room casing internal volume of the emulsification disperser M1 is about 20 to 200 times the amount in size to the outside volume of a stator rotor part. If the double jacket outside was provided outside as a cooling means, and if the cooling means which was equipped with the corrugated tube inside is established, a chilling effect can also be heightened and the emulsification state of an emulsification coagulant can be made stably. In addition, although not illustrated, the batch container equipped with an emulsification disperser may be changed by turns or liquid may feed continuously with the metering pump Pt from each batch container.

Figure 5:
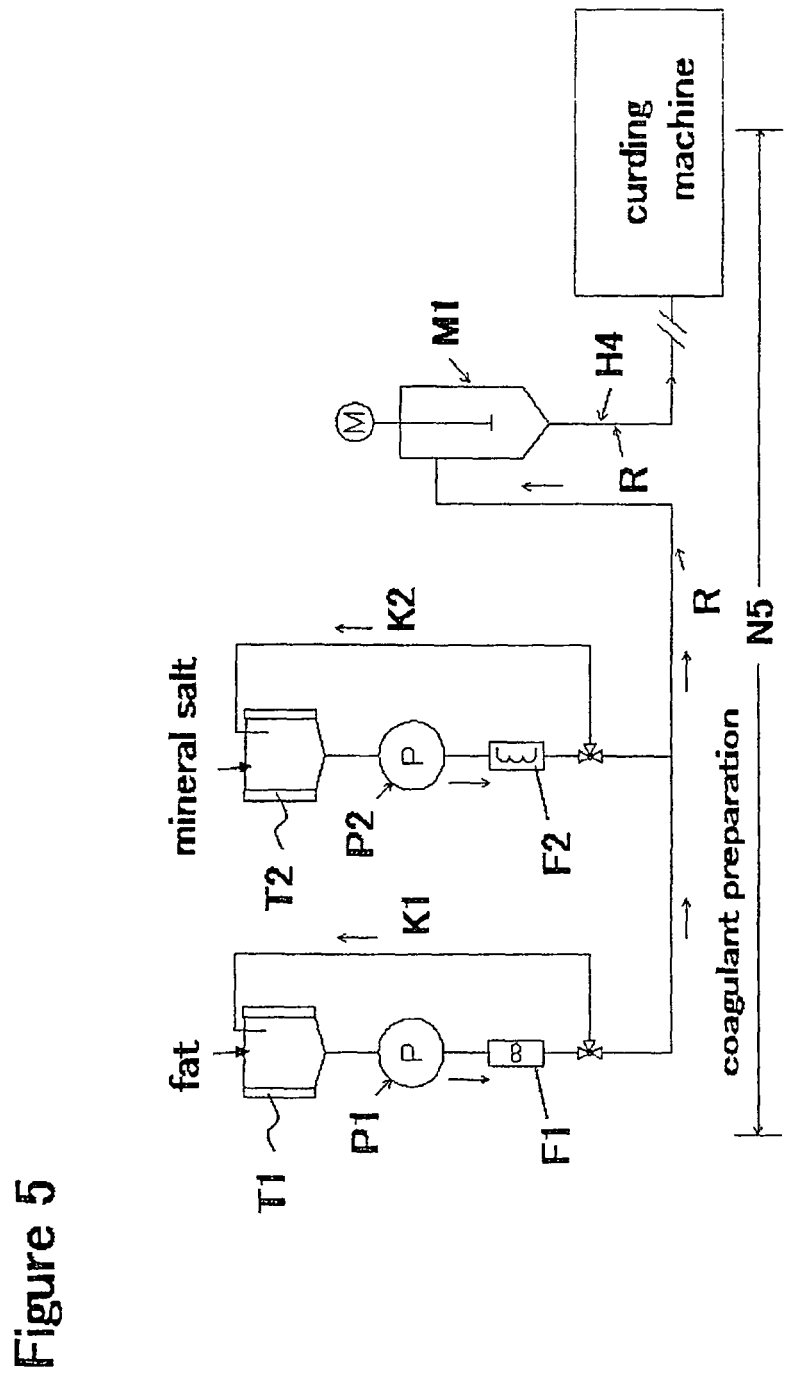
FIG. 5 is a schematic view for illustrating another example as the soymilk coagulation machine comprising the tofu coagulant producing apparatus according to the second embodiment of the present invention.

FIG. 5 shows a batch type tofu coagulant producing apparatus N5 of the emulsification coagulant for tofu manufacture which consists of the piping H4 connected under the above-mentioned emulsification disperser (the batch container in which an emulsification room is comparatively large, and emulsification room casing internal volume which are the sizes of about 2 to 20 times the amount to the outside volume of a stator rotor part), and the soymilk tank T3 of the above-mentioned FIG. 4 so that connection of soymilk pathway H5 of sending soy milk is possible. It is the so-called form of batch continuous system. Even if it manufactures an emulsification coagulant in time part, it is not necessary to be scooped up by the dipper etc. and to make it able to mix with soy milk, and it can be made mixed with soy milk continuously in this example. By arranging a metering pump on piping which sends a soy milk pathway and an emulsification coagulant, it is uniformly mixed with sufficient vigor and becomes quality soy milk solidification. Here, although illustration is not carried out, it is desirable that it connects with the soy milk pathway N4 of sending soy milk with the metering pump P3 from the soy milk tank T3 of FIG. 1, or a metering pump is arranged on the piping H4 which sends the above-mentioned emulsification coagulant. In addition, the batch container (namely, emulsification room) in the present invention is a size of 1 time or more, and a size which became somewhat large to a medium degree (up to 10 times), to the minimum emulsification room capacity of the continuous system emulsification disperser M1. It is the form to which only the container became large relatively compared with the continuous one path type, so that fixed holding time (1 to 60 seconds) is established in the emulsification interior of a room and a uniform and detailed emulsification state is made and it has a double jacket outside as a cooling means, if the cooling means equipped with the corrugated tube inside is established, a chilling effect can also be heightened and it can be made the stability of an emulsification coagulant.

Third Embodiment

Figure 6:
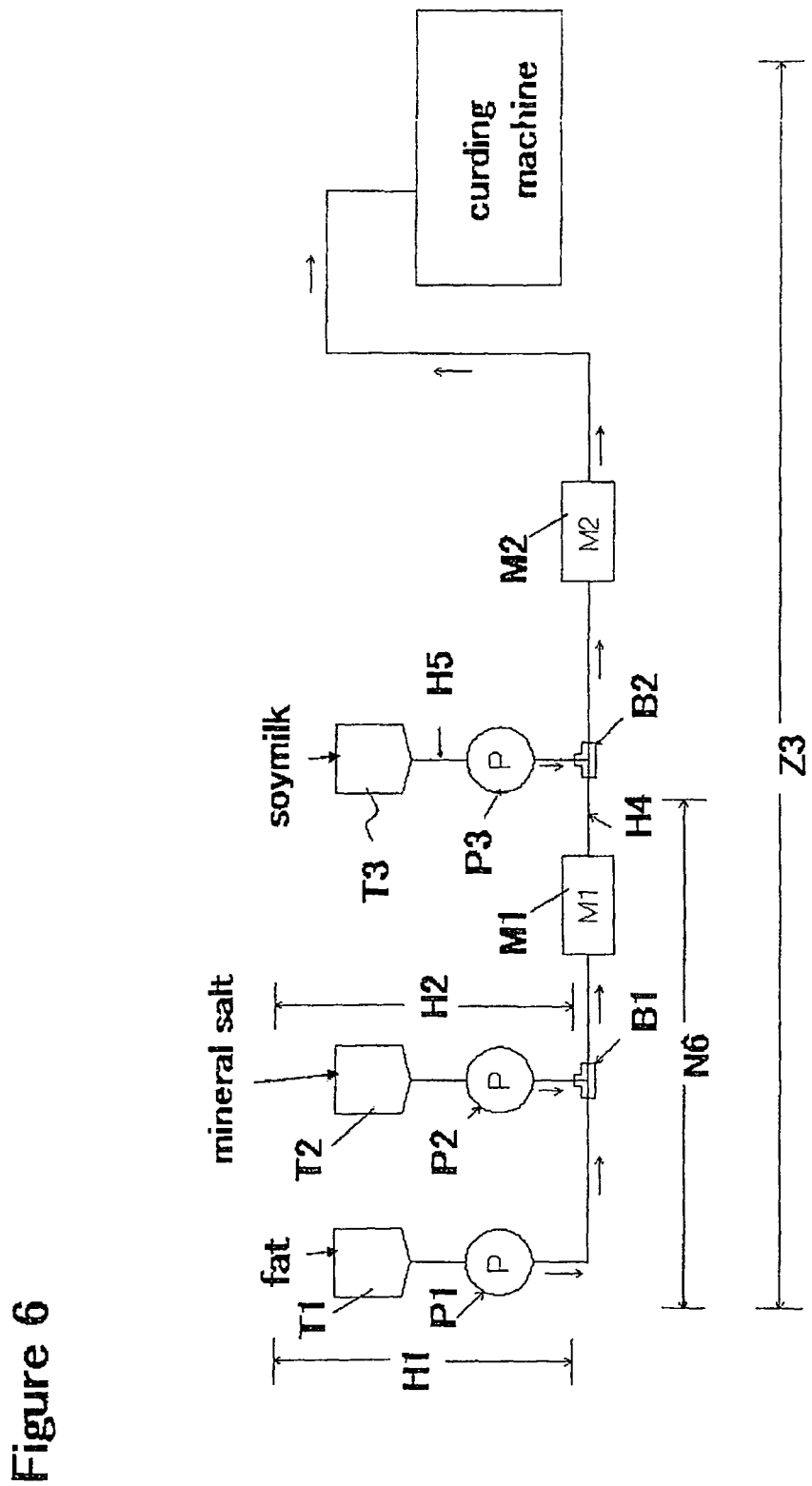
FIG. 6 is a schematic view for illustrating the soymilk coagulation machine comprising the tofu coagulant producing apparatus according to the third embodiment of the present invention.

As shown in FIG. 6 as the tofu coagulant producing apparatus N6 of the form of this embodiment, even if there is neither a heat exchanger nor a flow instrument, it can constitute, and even if there is no connection-sleeves way, it can constitute. That is, the tofu coagulant producing apparatus N6 equipped with the liquid food oil pathway H1 sending the edible liquid food oil with the metering pump P1 from the edible liquid oil tank T1, the mineral salt solution pathway H2 sending the mineral salt solution oil with the metering pump P2 from the mineral salt solution tank T2, and the emulsification disperser which changes the churning mixture of edible liquid oil and the coagulant solution into an emulsification state can also be constituted. And the soy milk solidification equipment Z3 for tofu manufacture connected with the soymilk pathway H5 of sending soy milk with the metering pump P3 from a soy milk tank can also be constituted.

Comparative Example

Figure 7:
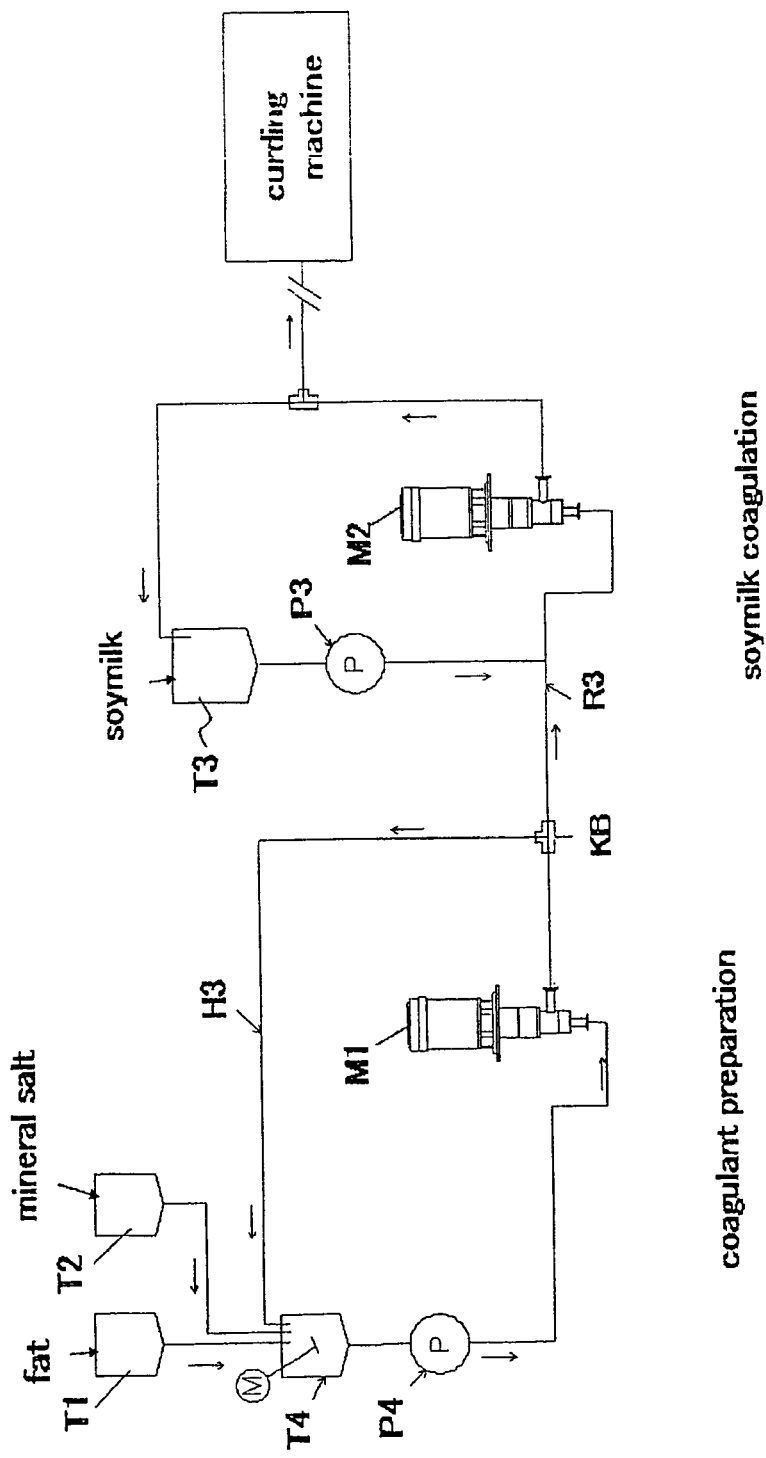
FIG. 7 is a schematic view for illustrating the related art to the soymilk coagulation machine.

As shown in FIG. 7, what feed from the tank T1 which stores edible liquid oil, and the tank T2 which stores a coagulant mixed in the storage tank T4, and these are mixed by the emulsification disperser M1, and it is an equipment of the comparative example which consisted of circle methods of returning the thing mixed by this emulsification disperser M1 to the storage tank T4. That is, it is the structure returned to the storage tank T4 from the connection part KB after the emulsification disperser M1. The equipment of the form of this enforcement and the form of each above-mentioned implementation is compared. As shown in the patent documents 1, in the comparative example shown in FIG. 7, the phenomenon (demulsification) which tries to return to the state of a basis gradually, or destroys the emulsified emulsification coagulant in process of circulation of the emulsified emulsification coagulant which was manufactured in process of the circulation was seen. Moreover, since edible liquid oil and a coagulant are not sent with a metering pump, the emulsification coagulant which the W/O type (water in oil type) emulsified primarily is hard to be obtained. That is, while the specific gravity of edible liquid oil is about 0.8 to 0.9 and the specific gravity of a coagulant is about 1.2 to 1.4, in order to make a W/O type (water in oil type) emulsify these, it is necessary to adjust a flow like the ratio (bulk density) of the aqueous phase and the oil phase.

Producing Condition for Tofu Coagulant

According to the invention, the raw materials are only coagulant solution and edible fat and oil. The emulsifier or the stabilizer of the indispensable food additives are not used for the purpose of emulsification or emulsification stability conventionally. Here, coagulant solution is solution containing at least one of a magnesium chloride, a calcium chloride, sodium chloride, potassium chloride and magnesium sulfate which are a food additive and food raw material, and crude sea salt-ized magnesium (what is called "bitterness of life") and it is a magnesium chloride and the bitterness of life which have typical coagulant solution. Organic acid (citrate, gluconic acid, etc.) can be included in calcium sulfate of less than solubility, calcium sulfate of a particle, and others.

Edible fat and oil is oil and fats which contain DAG 1% or more, and should just be the oil and fats generally manufactured to edible. It is desirable that it is not solid fat (fat) but edible liquefied oil and fats at the time of emulsification at least. Otherwise, it deposits in a flow instrument or piping and becomes a problem. That is, it holds to the melting point (coagulating point) of the oil and fats in a case more nearly previous than emulsification distribution, or the temperature exceeding the highest melting point (coagulating point) in a case of mixed oil fat. DAG contained in the edible fat and oil is a natural ingredient which is inherent in the oil and fat products instead of synthetic compounds and an additive from the first. In products on the market, they are, for example, olive oil, corn oil, rice bran oil, cottonseed cake oil, palm oil, sesame oil, soybean oil, rape oil, etc., about 0.1 to 15% of DAG is generally contained (refer to Table 4). The content changes with oil-and-fats materials, its state, the oil expression method, refining methods, etc. For example, with olive oil, pure oil and virgin oil may be mixed and used, the oil and fats (processed fat is also included) in which DAG content differs can be blended, and emulsification stability and a soy milk solidification delayed effect can also be adjusted. Moreover, although emulsification stability and a soy milk solidification delayed effect have little influence as for the product in which silicone (antifoaming agent) was added like business-use tempura oil, the product which added lecithin and MAG is good to avoid, since there may be evils, like a solidification delayed effect becomes weaker. Moreover, although the vegetable oil which removed precipitation and muddiness with the winter ring (chilling treatment) may be sufficient, the oil and fats whose high DAG content of the melting point decreased extremely may not be desirable to the present invention.

Table 4 expresses the ease of carrying out of emulsification (does it become a W/O emulsion easily after emulsification distribution or not?), and emulsification stability (even if the W/O emulsion which once seems to be stable is obtained, in the warming conditions (accelerated test) at 45 degrees C., it may be dissociated or stabilized.).

As an appraisal method of stability, we extract an emulsification thing in very small quantities between a prepared slide, press a cover glass, and perform observation and photography using the digital microscope (KEYENCE VHX-500F) immediately, and 1 hour after putting into 45 degrees C. constant temperature bath, we perform observation and photography in a similar manner again, and decide to compare and judge the change of state of an emulsification thing. All the diameters of a particle were measured from two or more taken photographs, and particle size distribution was searched for. Although the "predetermined temperature" of emulsification distribution differs according to the melting point (coagulating point) of oil and fats, if the "predetermined temperature" is about 45 degrees C., it is liquefied of almost all edible fat and oil. It is good if liquefied above the melting point of the oil and fats made applicable to comparison, and for example, 5 degrees C. of conditions of 2 hours or more of 35 degrees C., for 4 hours or more of 25 degrees C., for 8 hours or more of 15 degrees C., for 16 hours or more of 5 degrees C. can be set. In addition, the particle diameter of the aqueous phase of the emulsification coagulant in the present invention is desirable is the range of 0.1 to 20 micrometers, and is desirable when it is in about 1 to 10 micrometers, and if it is in 1 to 5 micrometers, it is the most desirable.

Edible fat and oil is oil and fats which contain DAG 1% or more, and should just be the oil and fats generally manufactured to edible. It is desirable that it is not solid fat (fat) but edible liquefied oil and fats at the time of emulsification at least. Otherwise, it deposits in a flow instrument or piping and becomes a problem. That is, it holds to the melting point (coagulating point) of the oil and fats in a case more nearly previous than emulsification distribution, or the temperature exceeding the highest melting point (coagulating point) in a case of mixed oil fat. DAG contained in the edible fat and oil is a natural ingredient which is inherent in the oil and fat products instead of synthetic compounds and an additive from the first.

Example 1

The "soft wafer" by Ako Kasei Co., Ltd. is used for bittern solution (magnesium chloride), the olive oil (commercial item; pure olive oil made from J-OIL MILLS, Inc.) as vegetable oil is used for it, and the temperature of magnesium chloride solution is 19.1 degrees C., and the temperature of olive oil was 10.3 degrees C. or 4.1 degrees C.

A magnesium chloride and tap water are beforehand prepared at a rate of 2:1, and they are made thick magnesium chloride solution of 66.7% w/w (specific gravity about 1.3, 4.3M), and this 500 g of magnesium chloride solution and 500 g of olive oil are supplied to an emulsification disperser (for Pacific Machinery & Engineering Co., Ltd., named Milder for laboratory), mixing coarsely in an equivalent amount respectively, and it is a deed about emulsification distribution continuously at 10000 rpm of number of rotations of a rotor, throttling an exit valve and applying internal pressure 0.001 to 1.0 MPa (preferably 0.01 to 0.3 MPa), and the batch type solidification machine (Made in Takai Tofu & Soymilk Equipment Co., named "Mini-Curdy") equipped with the solidification disperser (Made in PRIMIX Corporation, named "Homo-mixer Mark 2-40 type") M1 and the equipment N1 of the form of the first embodiment are used for the soymilk coagulation machine which obtained the emulsification coagulant (coagulant for tofu), and then the cooling means R has been arranged in the jacket part (position of the mark R of FIG. 1) of Milder and when cooling, it let 10 degree C. cold water (preferably 0 to 5 degree C.) pass.

In the coagulant reaction to soy milk, the soy milk for smooth fine-grained tofu 12 liters (13% brix, 80 degree C.) obtained by the prescribed method shall be put into a flat package type box, the addition of an emulsification coagulant (coagulant for tofu) shall be 2.8 g as a magnesium chloride (hexahydrate) equivalent unit to 1 liter of soy milk, and after emulsification manufacture, the emulsification coagulant for less than 60 minutes is measured with an injector (syringe-type measurement pump), and is poured into soy milk, and it agitated for about 20 seconds at 2000 rpm of number of rotations of the above-mentioned solidification disperser M1, and performed batch type solidification. Maturation time was carried out for 30 minutes, evaluation by observation and a sample of tofu (smooth fine-grained tofu) was performed, and the result shown in Table 1 was obtained. In the case of the operation 1-3 and the case of the operation 1-1, all had a smooth skin and beautiful pudding-like smooth fine-grained tofu was manufactured. In 0.5 minute in emulsification time, like the case of the operation 1-2, the temperature of the emulsification thing rose at about 30 degree C. with churning heat (frictional heat), the emulsification thing became extremely unstable, its cutting plane of tofu was ruined for a while, and its emergent increased. When the temperature after emulsification was controlled using the cooling means R like the case of the operation 1-1, or when it is cooled beforehand (refrigeration) and oil-and-fats temperature was also made low especially like the case of the operation 1-3, the rise in heat of the done emulsification coagulant is suppressed and the quality of the smooth fine-grained tofu made using them was good. (In addition, the congelation at the time of adding water bittern solution to 80 degree C. soy milk independently as a comparative example was omitted since it is the weak thing whose skin got chappy and then it does not deserve comparing.)

Example 2

"White-Nigari", the product made from the Naikai Salt Industries CO., LTD., is used for magnesium chloride solution as Nigari (magnesium chloride), olive oil (commercial item; pure olive oil made from J-OIL MILLS, Inc.) was used for it as vegetable oil, and the temperature of magnesium chloride solution was beforehand put on the freezer, and was made into −7 degree C., and the temperature of olive oil was beforehand put on the refrigerator, and was 4.2 degree C.

A magnesium chloride and tap water are beforehand prepared at a rate of 2:1, and they are made thick magnesium chloride solution of 66.7% w/w (specific gravity about 1.3, 4.3M), and emulsification distribution (for Pacific Machinery & Engineering Co., Ltd., named Milder for laboratory) was performed for this 500 g of magnesium chloride solution and 500 g of olive oil as 10000 rpm of number of rotations of a rotor using the solidification disperser. In addition, the magnesium chloride concentration in this emulsification coagulant is about 33% wt, and specific gravity is about 1.1.

In the case of the example 2, it is one-way (one path type) simple equipment through which it does not circulate (FIG. 6), without controlling the temperature in a system, when the emulsification state was judged to be good, the solidification disperser (churning mixer) M1 was stopped. The cooling means R is not arranged.

Next, a stood type mixer (a NORITAKE Company static mixer and a Takai factory TS mixer are connected.) is used, it is the soy milk for smooth fine-grained tofu (13% brix, 80 degree C.) obtained by the prescribed method, and solidified by adding continuously in the soy milk which flows through an emulsification coagulant in within 5 minute to 60 minute after emulsification manufacture. A coagulant addition shall be 2.5 g, as a magnesium chloride equivalent unit, to 1 liter of soy milk, and at the soy milk flow 200, 300 or 420 liter/hour and at the above-mentioned soy milk coagulant 1.36, and 2.05 or 2.86 liter/hour, solidification delay time after receiving in a 3-liter type box (container 5 for solidification) until it solidifies was judged and measured visually. Time until soy milk specifically carries out rotation current ON and the flow of soy milk stops completely from the end time of soy milk measurement was measured. Tofu obtained after maturing for 30 minutes takes out from a model box and starts 20 mm in diameter, and 20 mm in height in the shape of a pillar, and using a 23-mm plunger, hardness (fracture power), distortion, crisp, and a flavor were measured with a rheometer (Fudo Engineering Co., Ltd., NRM-2002J and plunger diameter 20 mm, sample table rising speed 60 mm/minute). Moreover, appearance estimated whether it was smooth fine-grained tofu. As a result, the hardness of tofu has the highest conditions of 300 liter/hour of soy milk flows like the case of the operation 2-2 of Table 2, and it became tofu somewhat soft in 200 liter/hour (case of the operation 2-1), and became the tofu whose skin got chappy in 420 liter/hour (case of the operation 2-3).

TABLE 1

| | Cooling means | Fat temperature (deg C.) | Nigari Temperature (deg C.) | Emulsifying time (sec.) | Coagulant Temperature (deg C.) | Tofu Evaluation |
|---|---|---|---|---|---|---|
| Example 1-1 | yes | 10.3 | 19.1 | 120 | 22.3 | good |
| Example 1-2 | no | 10.3 | 19.1 | 50 | 29.0 | not so good |
| Example 1-3 | yes | 4.1 | 3.6 | 230 | 19.0 | very good |

TABLE 2

| | Tofu flow (Liter/hour) | Fat temperature (deg C.) | Nigari Temperature (deg C.) | Slow-acting time (sec.) | Tofu hardness (×10² N/m²) | Tofu Evaluation |
|---|---|---|---|---|---|---|
| Example 2-1 | 200 | 4.1 | −7 | 30.0 | 81.1 | good |
| Example 2-2 | 300 | 4.1 | −7 | 12.3 | 89.2 | very good |
| Example 2-3 | 420 | 4.1 | −7 | 5.4 | 83.7 | good |

Example 3

Just like the case of the example 2, as vegetable oil, the 1:1 combination oil of the corn oil (made by Boso Oil & Fat Co., Ltd.) and the palm oil (made by Fuji Oil Mill incorporated company), Soybean oil (product made from J-OIL MILLS), rice bran oil (product made from J-OIL MILLS), corn oil (made by Boso Oil & Fat Co., Ltd.), and rapeseed oil (product made from J-OIL MILLS) are used, and the temperature of Magnesium chloride solution as Nigari and each oil and fats is 13 degree C., and prepared the emulsification coagulant like the case of the Example 2. The equipment of the form of the second embodiment was used for the emulsification equipment and soy milk solidification equipment of a coagulant. The number of rotations of the same solidification dispersing device M1 as the case of the Example 1 could be 2000 rpm.

Next, the emulsification coagulant was added to the soy milk (13% brix 80 degree C.) for smooth fine-grained tofu obtained by the prescribed method, distributed churning was continuously carried out by the solidification disperser M2 of the soy milk solidification part, the 3-liter container for solidification receives them at an exit, and it performed solidification and maturing. The coagulant addition was 2.8 g as a magnesium chloride equivalent unit to 1 liter of soy milk, and carried out maturation time for 30 minutes. Thus, the manufactured tofu is picked out from a model box (container for solidification), and it starts in 20 mm in diameter, and 20-mm-high pillar form, using a 23-mm plunger, hardness (fracture power), distortion, crisp, and a flavor were measured with a rheometer (Fudo Engineering Co., Ltd). The result which carried out trial production evaluation was shown in Table 3. Moreover, the Secretary of the Interior was observed, tried and evaluated by appearance about whether beautiful smooth fine-grained tofu was manufactured.

Although soybean oil was also possible like the case of the Example 3-2, the solidification delayed effect was weak and tofu felt weakness a little, hardness was excellent in a smooth skin.

When rapeseed oil, corn oil, and rice bran oil were used like the case of the Example 3-3, the case of the Example 3-4, and the case of the Example 3-5, adjustment of an emulsification coagulant is possible, and the delayed effect was demonstrated and a smooth skin was enough also as hardness.

In case of the Example 3-1, it is what mixed corn oil and palm oil (corn oil+palm oil), and there were solidification delayed effects of enough in this case, and although it was somewhat soft, and evaluation of tofu was high, hardness was a little lacking. Palm oil has comparatively much DAG and corn oil is also cheap oil and fats. The solidification delayed effect of palm oil is also high. Moreover, since the melting point of palm oil is high and it solidifies near normal temperature independently, it is just going to be supposed that it is hard to treat, but if it mixes with palm oil versus corn oil etc. in 1:1-1:10 grade, since it will become liquefied or the shape of liquid which became cloudy, it becomes comparatively easy to deal with an equipment top, and also the delayed effect of a coagulation reaction also increases, and skin is finer and it becomes more elastic smooth tofu.

TABLE 3

| | Fat (oil type) | Fat and Nigari temperature (deg C.) | Slow-acting time (sec.) | Tofu hardness (×10² N/m²) | Tofu Evaluation |
|---|---|---|---|---|---|
| Example 3-1 | Cone and Palm | 13 | 40 | 47.1 | very good |
| Example 3-2 | Soybean | 13 | 15 | 52.9 | good |
| Example 3-3 | Rapeseed | 13 | 30 | 45.1 | good |
| Example 3-4 | Cone | 13 | 25 | 48.0 | good |
| Example 3-5 | Rice | 13 | 30 | 58.8 | good |

In case of the Example 3-2 which uses soybean oil, although there was a soy milk solidification delayed effect, even if the emulsion coagulant was long, it has maintained the emulsification state only about 1 minute. This was considered that DAG contained therein is less than corn oil or palm oil.

Example 4

In oil and fats typical in various cooking oil, componential analysis results, such as DAG, stability when it learns from the case of the Example 1 and an emulsification thing is prepared on fixed conditions, etc. were shown in Table 4. It evaluated in respect of emulsification decentralized stabilization, that is, the point whether to become a W/O emulsion easily, and to dissociate on conditions warming (accelerated test) of 45 degree C. An emulsification distribution examination is a batch type as shown in FIG. 3, and it uses a solidification disperser (Yamato Scientific Co., Ltd, named Ultra-disperser LK-22 with generator shaft: S-25N-10 G,), agitating the oil and fats 50 g at 20,000 rpm, 50 g of 4M magnesium chlorides were added, and emulsification was performed for 3 minutes.

It was clear to correlate with the ease of emulsifying, stability, and the DAG content instead of MAG content well so that clearly from Table 4. DAG content also has the difference from a literature value, and can observe changing greatly with the kind of oil and fats, manufacturing conditions of the materials and oil and fats, etc. Table 4 shows that any DAG content is 1-10% of range. Although not shown in Table 4, all the phosphatide in each oil and fats was below the detection limit (less than 0.1%). On warming conditions of 45 degree C., the emulsification state for 120 minutes has been checked about palm oil, corn oil, and pure olive oil. In virgin olive oil, soybean oil, and coconut oil, it was in the somewhat unstable state. In addition to macadamia nuts oil and safflower oil, from perilla oil (from Table 4 to an omission), an emulsification state was not acquired several minutes. If macadamia nuts oil and safflower oil also use a cooling means and a one path emulsification system, an emulsification thing more stable than it will be obtained. In addition, although data was shown, the clear correlation with the amount of saturated fatty acid, the number of double bonds and viscosity (viscosity at the time of cooling), etc. of free fatty acid (acid value) other than DAG and constituent fatty acid, was not accepted. In an oil manufacture process top, the great portion of MAG, phosphatide, and free fatty acid are removed. However, since it is hard to be dissociated from TAG, DAG is intermingled in oil and fat products.

In addition, about the acid value of commercial oil and fat products, almost all oil and fat products are 0.2 or less acid values by the Japanese Agricultural Standards standard. Four or less are a maximum in sesame oil and two or less are a maximum in olive oil, and there are restrictions naturally. Edible fat and oil in the present invention is aimed at the oil and fat products which suit, for example, "edible-plants oil and fats" or "edible refining processed fat" defined by Japanese Agricultural Standards in Japan.

Oil and fats suitable for the present invention are influenced by oil-and-fats materials, the oil expression/refining condition, processing conditions, etc., and even if an oil-and-fats kind is oil and fats except having listed here, it should just be it oil and fats with which it is satisfied of the conditions on the present invention, and is not limited.

TABLE 4-1

|  |  | Palm oil | Corn oil | Pure olive oil | Virgin olive oil |
|---|---|---|---|---|---|
| Emulsion easiness (*a) |  | 7 | 5 | 5 | 3 |
| Emulsion stability (*b) | min. | 120 | 120 | 120 | 60 |
| MAG (*1) | % | 0.2 | 0.8 | 1.0 | 0.4 |
| DAG measured (*1) | % | 7.5 | 5.2 | 5.4 | 3.6 |
| DAG literature (*2) | % | 5.8 | 2.8 | 5.5 | 5.5 |
| TAG (*1) | % | 92.7 | 94.4 | 94.4 | 94.9 |
| Acid value (*3) |  | 0.11 | 0.13 | 0.18 | 0.76 |
| Fatty acid value (*c) | % | 0.05 | 0.05 | 0.09 | 0.38 |
| Saturated fatty acid (*d) | % | 50.7 | 14.3 | 14.2 | 14.2 |
| Double bond (*d) | % | 1.8 | 4.0 | 2.8 | 2.8 |
| Viscosity at room (*4) | mPa·s | 70 | 52 | 62 | — |
| Viscosity at 10 deg C. (*4) | mPa·s | — | 108 | 133 | 133 |
| Slow-acting character |  | very good | very good | very good | good |

TABLE 4-2

|  |  | Rice oil | Cotton seed oil | Peanut oil | Soybean oil |
|---|---|---|---|---|---|
| Emulsion easiness (*a) |  | 7 | 7 | 2 | 2 |
| Emulsion stability (*b) | min. | 120 | 20 | 90 | 20 |
| MAG (*1) | % | 0.4 | 0.3 | 0.5 | 0.4 |
| DAG measured (*1) | % | 9.9 | 7.8 | 3.6 | 3.2 |
| DAG literature (*2) | % | — | 3.1 | 2.2 | 1.0 |
| TAG (*1) | % | 89.7 | 91.3 | 95.7 | 97.2 |
| Acid value (*3) |  | 0.16 | 0.12 | 0.20 | 0.10 |
| Fatty acid value (*c) | % | 0.08 | 0.06 | 0.10 | 0.05 |
| Saturated fatty acid (*d) | % | 21.6 | 26.2 | 13.4 | 14.7 |
| Double bond (*d) | % | 3.6 | 3.9 | 3.6 | 4.6 |
| Viscosity at room (*4) | mPa·s | 73 | 55 | 72 | 49 |
| Viscosity at 10 deg C. (*4) | mPa·s | 133 | 114 | 122 | 100 |
| Slow-acting character |  | good | good | not so good | not so good |

TABLE 4-3

|  |  | Coconut oil | Rapeseed oil | *Macadamia* nut oil | Safflower oil |
|---|---|---|---|---|---|
| Emulsion easiness (*a) |  | 2 | 2 | 0 | 0 |
| Emulsion stability (*b) | min. | 20 | 60 | 0 | 0 |
| MAG (*1) | % | 0.5 | 0.4 | 0.3 | 0.4 |
| DAG measured (*1) | % | 2.5 | 3.2 | 2.2 | 2.4 |
| DAG literature (*2) | % | 2.2 | — | — | 2.1 |
| TAG (*1) | % | 97.2 | 96.1 | 97.5 | 96.6 |
| Acid value (*3) |  | 0.11 | 0.12 | 0.06 | 0.08 |
| Fatty acid value (*c) | % | 0.04 | 0.06 | 0.03 | 0.04 |
| Saturated fatty acid (*d) | % | 30.4 | 26.2 | 10.3 | 11.3 |
| Double bond (*d) | % | 0.3 | 3.9 | 2.6 | 4.9 |
| Viscosity at room (*4) | mPa·s | 52 | 55 | 73 | 55 |
| Viscosity at 10 deg C. (*4) | mPa·s | — | 117 | 135 | 129 |
| Slow-acting character |  | not so good | not so good | bad | bad |

*a Emulsion easiness (Batch examination)
*b 45 degree C. separation time (Batch examination)
*c The amount of free fatty acid = it computes by acid value/56× (average molecular weight − 38)/3/1000 × 100.
*d From fatty acid composition to calculation.
*1 Japan Institute of Oils & Fats, Other Food Inspection Foundation analysis result
*2 R. P. D'alonzo, W. J. Kozarek and R. L. Wade.: J. Am. Oil Chem Soc., 59, 292, (1982) Journal of the American Oil Chemists' Society
*3 Its company measurement result
*4 Its company measurement result (B-type-viscosity meter BL adapter use)

Example 5

Next, the result of having experimented and considered the relation between concentration of a mineral salt coagulant, the quality of tofu, and a relation with a manufacture unit price is Table 5. As equipment, as shown in FIG. 1 and FIG. 2, it has an oil-and-fats feed unit consisting of the tank T1 for oil and fats, and the metering pump P1 (the flow instrument for oil and fats, and the indicating controller for oil and fats) for oil and fats, and an aqueous Nigari solution feed unit consisting of the tank T2 for bittern solution and the metering pump P2 (the flow instrument for bittern solution and the indicating controller for bittern solution) for bittern solution, and the exit of both feed units was connected with the feed opening of the emulsification dispersing device M1, and the one path process of obtaining an emulsification coagulant from the exit of the emulsification dispersing device was used. It is also effective to establish the cooling means (heat exchanger) R1 and R2 which used chiller water etc. for the coolant as shown especially in FIG. 2. Since generating of churning heat can be stopped at worst and a stable emulsification state can be especially held in the case of one path continuous system, it is a desirable form.

In each case of the embodiment shown in Table 5, "Sofutoueha" and "Karumeit" (Both are made by the Ako Kasei Co., Ltd.) were used for NIGARI (magnesium chloride) and a calcium chloride, and an olive and safflower oil (both are the products made from J OIL Co.) were used for them as vegetable oil. As a cooling means, the jacket tank (T1, T2) was used for the materials tank, 10 degree C. cold water was used as the coolant, and the temperature of each raw-material liquid was about 15 degree C. The back pressure regulating valves V1 and V2 were formed in the cycling pathway of materials, and it was adjusted to 0.1 MPa. As the emulsification disperser M1, "Milder" by Pacific Machinery & Engineering Co., Ltd., (for research and development, with a jacket, passing water about 10 degree C. cold water as a coolant) is used, emulsification distribution was performed at 8,000 rpm of number of rotations, the back pressure regulating valve V3 was formed in the exit, and internal pressure was adjusted to 0.1 MPa. While soy milk is sent by the metering pump P3 at the 40 liters/minute flow velocity, it set to each amount of coagulant aqueous flow, and each cooking oil flow with each metering pump P1 and P2 to become 0.3% of a magnesium chloride addition, or 0.2% of a calcium chloride and to become as the ratio of coagulant solution versus cooking oil is shown in Table 5. For example, coagulant solution (2M magnesium chloride) is sent by 324 g/minute and cooking oil (olive oil) is sent by 324 g/minute in fixed quantity, and it was made to be supplied to the emulsification disperser M1 in the case of the Example 5-1 of Table 5. Other conditions were set up similarly. The emulsification coagulant obtained from the emulsification disperser M1 is supplied to soy milk piping by in-line one by the flow of 648 g/minute, The emulsification disperser M2 (PRIMIX Corporation make TK pipe-line gay mixer) is used, and it is a diffusion part handbill at 2,000 rpm of number of rotations and soy milk is made to distribute an emulsification coagulant, received in the box type for about 15 seconds, the amount of about 10 liters of the soy milk containing a coagulant was made to leave at rest and ripe for 30 minutes, and smooth fine-grained tofu was made as an experiment.

As a result, in the case of the Example 5-1 and the case of the Example 5-2, all had a smooth skin and beautiful pudding-like smooth fine-grained tofu was manufactured. Like the comparative example 5-2, on the emulsification conditions of coagulant liquid thick at safflower oil, it was unstable, and the cutting plane of tofu was ruined and emergent increased. Even if the amount of cooking oil is low like the case of the Example 5-4, it was emulsification state instability.

Olive oil was used as oil and fats, and safflower oil was used as a comparative example. Each amount of DAG(s) was 5.4 or 2.4% (% w/w) among oil and fats. 1, 2, 4M magnesium chloride (it is saturation mostly at normal temperature), and 4M calcium chloride (it is saturation mostly at normal temperature) were used. The emulsification thing, whose mineral salt coagulant solution for tofu and edible fat and oil are 1:0.2-1:3 (preferably 1:0.4-1:1-1:1.5) in a bulk density, is cooled at 50 degree C. or less at the time of emulsification or after emulsification (exactly, up to the melting point and near coagulating point of the oil and fats to be used or the melting point and near coagulating point of the oil and fats to be used), so that the viscosity increase at the time of oil-and-fats cooling is controlled. For example, when it is in 30 degree C. immediately after emulsification at melting point −10−−15 degree C. in the case of corn oil, it cools to 10-25 degree C. Moreover, although it is considered as 27-50 degree C. of melting points in the case of the palm oil called solid fat, the actually solidified commercial palm oil is warmed, it will dissolve at last at 60 degree C., and it is after that, when it is in 60 degree C. immediately after emulsification, it cools to near 30-50 degree C. since about 30 degree C. does not become cloudy if it neglects and cools to room temperature. In addition, as a general trend, the viscosity of an emulsification thing tends to come out of a direction with few oil phases, an emulsification state is made more to stability. Although the viscosity of a commercial emulsification coagulant is about 1-2 Pa-s at room temperature and extraction from a container and handling are taken into consideration, in the present invention, the viscosity of an emulsification coagulant can be high depending on the form of connecting with a solidification machine as mentioned above, and it is also possible for it to be considered as 2-10 Pa-s, and to be considered as 10-100 Pa-s depending on selection of a pump or a flow instrument.

TABLE 5-1

|  | Comparative 5-1 | Example 5-1 | Example 5-2 | Comparative 5-2 |
|---|---|---|---|---|
| Mineral salt solution | 1M $MgCl_2$ | 2M $MgCl_2$ | 4M $MgCl_2$ | 4M $MgCl_2$ |
| Food fat | Olive oil | Olive oil | Olive oil | Safflower oil |
| Water phase:Oil phase ratio | 1:1 | 1:1 | 1:1 | 1:1 |
| Emulsion stability at 45 deg C. | very good | very good | good | NG separated few minutes |
| Slow-acting character | very good | very good | very good | NG |
| Tofu condition | soft | a little soft | hard | weak, emergent |
| Cost of coagulant | too high NG | a little high OK | half cost OK | half cost OK |

TABLE 5-2

|  | Example 5-3 | Example 5-4 | Comparative 5-3 |
|---|---|---|---|
| Mineral salt solution | 4M $CaCl_2$ | 2M $MgCl_2$ | 4M $MgCl_2$ |
| Food fat | Olive oil | Olive oil | Olive oil |
| Water phase:Oil phase ratio | 1:1 | 1:0.2 | 1:3.5 |
| Emulsion stability at 45 deg C. | good | good separated 1 hour | very good |

TABLE 5-2-continued

|  | Example 5-3 | Example 5-4 | Comparative 5-3 |
|---|---|---|---|
| Slow-acting character | very good | good | very good |
| Tofu condition | hard | hard | a little soft oily smell |
| Cost of coagulant | half cost OK | half cost OK | too high NG |

*a commercial tablet means Magnes Fine TG (made by Kao) which contains several % of poly glycerine fatty acid ester as an emulsifier.

Actually, the range cheap also in cost and economical sets the above-mentioned water phase and the oil phase ratio to 1:0.5-1:1-1:1.5, and in case of the oil phase not more than it, it becomes disadvantageous because an emulsification state is unstable and the soy milk solidification delayed effect falls, on the other hand, in case of the oil phase more than it, there is some disadvantageous fields, like the cost price becomes high since the quantity of oil and fats increases, and the tablet addition to soy milk increases.

Moreover, as molar concentration of thick mineral salt coagulant liquid, in the case of a magnesium chloride, at least, more than 2M is good, it is 3-5M preferably, and a maximum is less than 6.1M., the concentration of saturated solution of a magnesium chloride is, for example, 4.8M at 10 degree C., 5M at 40 degree C., 5.6M at 80 degree C. and a maximum of 6.1M at 100 degree C. and there is maximum concentration by temperature. Similarly, as maximum concentration, magnesium sulfate is set to a maximum of 3.8 M, and, as for a calcium chloride, a maximum of 8.8 M becomes a maximum. Similarly, as maximum concentration, magnesium sulfate is set to a maximum of 3.8 M, and, as for a calcium chloride, a maximum of 8.8 M becomes a maximum. Although it is good also as a slurry, as in the case where the crystal which has not melted in part is contained with a thick mineral salt coagulant, and the case of calcium sulfate (clearing up powder) of particulates, since the unevenness of a coagulant will arise by sedimentation, and control of the delayed effect of a soy milk coagulation reaction not only becomes difficult, but there is a possibility of damaging a pump, a valve, a flow instrument, etc., when there are many crystals, it is not so desirable.

Practically, when there are many water phases (disperse phase), an oil phase (continuous phase) will also be increased, and the cost price will be raised. Then, it is economically advantageous to reduce an aqueous phase and to stop an oil phase with a high unit price. And since the amount of the tablet used can be reduced if the salt concentration (for example, magnesium chloride concentration) in the tablet in the water phase is raised, it becomes possible to further hold down the cost price. In addition, in the nonpatent literature 2, it is indicated about the diluted solution of less than 0.5M, i.e., various salt solution of 0.5M. When emulsification stability is deduced and seen from FIG. 1 of the nonpatent literature 2 to a high concentration domain, it is expected that especially a magnesium chloride and a calcium chloride become unstable at high concentration, but it is the opposite side, it leads to the improvement in stability of the emulsification thing by the viscosity increase of an emulsification thing. With the thin inorganic salt solution less than 2M, especially below 1M, since there are few viscosity increases of an emulsification thing, there is little influence, but with thick liquid, it becomes a unique range, and a viscosity increase, generation of heat by churning heat, and a dissociation action of a mechanical emulsification thing become a serious obstacle. Therefore, it is desirable to use together a one path process and the cooling means R like the present invention. In addition, many products of commercial crude sea salt-ized magnesium have more than 2M (a sum of each mol of a magnesium chloride, a magnesium sulfate, a calcium chloride, a calcium sulfate in 1 L) as molar concentration converted into the magnesium chloride.

The interfacial tension to the distilled water of the above-mentioned edible fat and oil is 34 mN/m or less at room temperature.

It will be in a W/O type emulsification state with magnesium chloride solution, etc. and olive oil and rice-bran oil, and by DAG content with low interfacial tension (surface tension), the interfacial tension (surface tension) of the whole oil and fats declines, and there is an action (surface activity action) so that it may become stable as an outside disperse phase. The interfacial tension value of TAG and DAG is indicated in the nonpatent literature 3 and this point is made also as for an analogy to it, the DAG content and interfacial tension which are contained in commercial oil and fats from the first, and the relation of W/O type emulsification with still thicker mineral salt solution (especially bitterness of life) are not known until now.

Example 6

Next, the surface and interfacial tension of the liquid by a "hanging drop method" were measured (room temperature) about typical oil and fats in some numbers by using harmony interface science company make automatic surface-tension-balance angle-of-contact meter DropMaster series DM301 (room temperature).

TABLE 6

|  | Comparative 6-1 | Comparative 6-2 | Example 6-1 | Example 6-2 | Comparative 6-3 |
|---|---|---|---|---|---|
| Food fat | Perrila oil | Macadamia-nut oil | Soybean oil | Cone oil | Processing oil* |
| Interfacial tension (mN/m) | 34.2 | 29.2 | 32.5 | 26.1 | 12.5 |
| Emulsion easiness (*a) | 0 | 0 | 2 | 5 | 10 |
| Emulsion stability (*b) | 0 | 0 | 2 | 10 | 10 |
| DAG (%) | 3.6 | 2.2 | 3.2 | 5.2 | 87.1 |

It turns out that in the interfacial tension to distilled water, if 34 mN/m is exceeded under room temperature (setting to temperature at the time of emulsifying preferably); it will be hard to emulsify, and stability is also low, on the other hand, in the case of 34 or less mN/m, preferably 30 mN/m or less, a W/O type emulsification thing tends to be made and it is extremely stable. The Perilla oil whose interfacial tension exceeds 34 mN/m (comparative example 6-1) is not emulsified, on the other hand, the soybean oil whose interfacial tension is 30-34 mN/m is emulsified, and although emulsification stability is low, it becomes an emulsification thing for a short time (Example 6-1). Although there is much DAG content of perilla oil as 3.6% more slightly than 3.2% of soybean oil, it can be said that DAG content is dominant in emulsification (comparative example 6-2). On the other hand, if there are surface-active agents, such as an emulsifier, interfacial tension will decline, for example, will fall to less than 10 mN/m. Therefore, oil and fats especially whose interfacial tension is 10-34 mN/m under room temperature are desirable oil and fats on the embodiment of this invention. That is, such as the corn oil and the corn oil whose DAG is about 5%, when DAG is included at least 1% or more, preferably more than %, and/or when interfacial tension is 10-34 mN/m, preferably 10-30 mN/m, it can be called the oil and fats in which an emulsification thing with comparatively high emulsification stability is obtained (Example 6-2, and Example 6-3). Though natural, when temperature increases, interfacial tension also further falls and becomes advantageous to emulsification, then again, there is a field it is easy to become that union of emulsification particles occurs unstably being easy of a field due to the viscosity lowering of oil and fats or an emulsification thing. In addition, it is even if the above-mentioned interfacial tension is oil and fats which are 10-34 mN/m, when there is little diacylglycerol, it can be said that it becomes an emulsification thing whose ease of emulsifying and emulsification stability are both low.

The particle diameter of the water phase of the coagulant for tofu is an average of 0.01-100 micrometers of particle diameter.

The present invention can hold a W/O type emulsification state, and can fully carry out the delayed effect of the coagulation reaction of soy milk. It is the coagulant for emulsification distributed tofu prepared so that the particle diameter of an aqueous phase might be set to 0.01-100 micrometers desirable on an average and might be set to 0.1-10 micrometers on an average. If coarser than this, it will be in an unstable emulsification state and the delayed effect of a soy milk coagulation reaction will become low. On the contrary, although an emulsification state is stable and the delayed effect of a soy milk coagulation reaction increases even if too fine, viscosity increases and it automatic-becomes difficult to measure, and solidification unevenness may be caused that it is hard to distribute to soy milk, from the photograph which carried out penetration photography, the diameter of the aqueous phase particles in about 100 micrometer around is measured by a range finding function for two points, It is in the state which extracted the emulsification thing in small quantities to the slide glass, and was extended with the cover glass in the above-mentioned grain-size-distribution measurement, digital microscopes (the KEYENCE make, controller VHX-500F, high resolution lens VH-Z 500W, etc.) are used, and from the photograph which carried out penetration photography, the diameter of the aqueous phase particles in about 100 micrometer around is measured by a range finding function for two points, and a mean diameter (or median size) and standard deviation were calculated.

It is possible to change the particle diameter of a water phase with solidification disperser conditions, an oil-and-fats kind, temperature, etc. If particle diameter is fine, the delayed effect action of a coagulation reaction will increase, and if particle diameter is coarse, since a delayed effect action will fall conversely, it becomes possible to control a coagulation reaction according to an emulsification dispersion condition In addition, in the form of the above embodiment, as for soy milk temperature, 0-99 degree C. is good, and also its 60-95 degree C. is desirable, and, as for actually using regularly, 75-85 degree C. is the most desirable.

As mentioned above, in the above-mentioned embodiments, manufacture of smooth fine-grained tofu was explained to the example, soft cotton tofu, common cotton tofu, and fried-bean-curd cloth, thick-deep-fried-tofu cloth, deep-fried tofu cloth, etc. are contained in the tofu manufactured by this production method.

The invention claimed is:

1. A soymilk coagulating apparatus, comprising:
a liquid food oil tank holding a liquid food oil therein;
a first metering pump connected with the liquid food oil tank;
a liquid food oil pathway feeding the liquid food oil from the liquid food oil tank by the first metering pump;
a mineral salt solution tank holding a mineral salt solution therein;
a second metering pump connected with the mineral salt solution tank;
a mineral salt solution pathway feeding the mineral salt solution from the mineral salt solution tank by the second metering pump;
an emulsion dispersion machine stirring the liquid food oil with the mineral salt solution to produce an emulsified coagulant;
an accumulation tank holding the emulsified coagulant therein for a predetermined length of time;
a third metering pump connected with the accumulation tank;
a tofu coagulant pathway feeding the emulsified coagulant from the accumulation tank by the third metering pump;
a soymilk tank holing a soymilk therein;
a fourth metering pump connected with the soymilk tank; and
a soymilk pathway feeding the soymilk from the soymilk tank by the fourth metering pump; and
a coagulant dispersion machine stirring the soymilk with the emulsified coagulant,
wherein the liquid food oil pathway connects with the mineral salt solution pathway to be a combined pathway,
the mineral salt solution is added to the liquid food oil in a predetermined ratio by the second metering pump to produce the emulsified coagulant which is a water in oil (W/O) type emulsion produced without an emulsifier including phospholipids and monoacylglycerol,
at a downstream side of the apparatus after the emulsified coagulant is produced, the combined pathway connects with the soymilk pathway, or, the tofu coagulant pathway connects with the soymilk pathway, and
the tofu coagulant pathway and the soymilk pathway connect with the coagulant dispersion machine.

2. A soymilk coagulating apparatus according to claim 1, further comprising a plurality of the mineral salt solution pathways,
wherein the mineral salt solution is added for multiple times so that the mineral salt solution is added gradually.

3. A soymilk coagulating apparatus according to claim 1, further comprising a cooling unit connected to at least one of the liquid food oil pathway and the mineral salt solution pathway.

4. A soymilk coagulating apparatus according to claim 1, further comprising at least one of another cooling unit for cooling, and a pressing unit for pressing, the liquid food oil and the mineral salt solution, when dispersing the liquid food oil and the mineral salt solution, connected to the emulsion dispersion machine.

5. A soymilk coagulating apparatus according to claim 1, further comprising a flow-meter and an indicating controller on at least one of the liquid food oil pathway and the mineral salt solution pathway, wherein the indicating controller controls at least one of a discharge rate of the first metering pump connected to the liquid food oil pathway and a discharge rate of the second metering pump connected to the mineral salt solution pathway with a flow rate signal of at least one of the liquid food oil and the mineral salt solution detected by the flow-meter.

6. A soymilk coagulating apparatus according to claim 1, further comprising
a circulating pathway connected to at least one of the liquid food oil pathway and the mineral salt solution pathway, and
a back-pressure unit connected to a pathway towards the circulating pathway.

7. A soymilk coagulating apparatus according to claim 1, further comprising a plurality of the emulsion dispersion machines to stir the liquid food oil with the mineral salt solution for multiple times.

8. A soymilk coagulating apparatus according to claim 1, wherein the emulsion dispersion machine is connected to the accumulation tank.

9. A soymilk coagulating apparatus according to claim 3, wherein the cooling unit cools the liquid food oil and the mineral salt solution at a temperature ranging from −40 to 10° C.

10. A soymilk coagulating apparatus according to claim 9, wherein a temperature of the emulsified coagulant immediately before coagulation is 50° C. or lower.

11. A soymilk coagulating apparatus according to claim 4, wherein the pressing unit controls an internal pressure inside of the emulsion dispersion machine ranging from 0.001 MPa to 1.0 MPa.

12. A soymilk coagulating apparatus according to claim 5, wherein the flow-meter is a PID regulation which controls an output value with a potential, an integral, and a derivative to reduce a difference between an input value and a target value.

13. A soymilk coagulating apparatus according to claim 4, wherein the another cooling unit comprises a double layered jacket on an outer side thereof and a corrugated tube therein.

* * * * *